United States Patent [19]

Yarnall, Sr. et al.

[11] Patent Number: 5,769,032
[45] Date of Patent: Jun. 23, 1998

[54] METHOD AND APPARATUS FOR CONFINING ANIMALS AND/OR HUMANS USING SPREAD SPECTRUM SIGNALS

[76] Inventors: Robert G. Yarnall, Sr.; Robert G. Yarnall, Jr., both of P.O. Box 758, Kimberton, Pa. 19442

[21] Appl. No.: 794,014

[22] Filed: Feb. 3, 1997

[51] Int. Cl.⁶ .............................. A01K 3/00; A01K 27/00
[52] U.S. Cl. .......................... 119/721; 119/908; 340/573
[58] Field of Search ................................... 119/719, 720, 119/721, 908; 340/573

[56] References Cited

U.S. PATENT DOCUMENTS

| | | |
|---|---|---|
| 4,208,658 | 6/1980 | Fujiki et al. . |
| 4,225,206 | 9/1980 | Roman, Jr. . |
| 4,229,724 | 10/1980 | Marcus . |
| 4,242,668 | 12/1980 | Herzog . |
| 4,297,684 | 10/1981 | Butter . |
| 4,371,934 | 2/1983 | Wahl et al. . |
| 4,480,310 | 10/1984 | Alvarez . |
| 4,656,476 | 4/1987 | Tavtigian . |
| 4,733,633 | 3/1988 | Yarnall, Sr. et al. . |
| 4,745,882 | 5/1988 | Yarnall, Sr. et al. . |
| 4,898,120 | 2/1990 | Brose . |
| 4,967,695 | 11/1990 | Giunta . |
| 4,996,945 | 3/1991 | Dix, Jr. . |
| 5,067,441 | 11/1991 | Weinstein . |
| 5,121,711 | 6/1992 | Aine . |
| 5,161,485 | 11/1992 | McDade . |
| 5,170,149 | 12/1992 | Yarnall, Sr. et al. . |
| 5,207,178 | 5/1993 | McDade et al. . |
| 5,241,923 | 9/1993 | Janning . |
| 5,266,944 | 11/1993 | Carroll et al. . |
| 5,425,330 | 6/1995 | Touchton et al. . |
| 5,435,271 | 7/1995 | Touchton et al. . |
| 5,460,124 | 10/1995 | Grimsley et al. . |
| 5,465,687 | 11/1995 | Custer ..................................... 119/719 |
| 5,565,850 | 10/1996 | Yarnall, Jr. et al. ................. 119/721 X |
| 5,610,588 | 3/1997 | Yarnall, Jr. et al. ................. 119/721 X |
| 5,640,932 | 6/1997 | Bianco et al. ........................... 119/720 |
| 5,656,850 | 8/1997 | Yarnall, Jr. et al. ................. 119/721 X |

OTHER PUBLICATIONS

"Invisible Fencing" product brochure, coversheet and p. 5, 1991.

International Search Report, Appl. No. PCT/US95/09950, 1 page, 12 Oct. 1995.

Primary Examiner—Robert P. Swiatek
Attorney, Agent, or Firm—Ratner & Prestia

[57] ABSTRACT

A confinement system for animals operates by transmitting a first predetermined spread spectrum modulated signal to a receiver mounted on an animal's collar. The spread spectrum modulated signal is despread demodulated. The data on the signal is removed and deciphered by the receiver to determine if the received signal is the correct discrete spread spectrum modulated signal. If the demodulated and reference signals are similar, then the signal strength of the first signal is used to determine whether the animal is close to a boundary area. If the spread spectrum modulated and reference signals are not similar, the first signal is ignored.

31 Claims, 19 Drawing Sheets

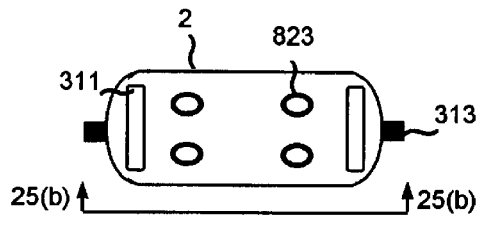 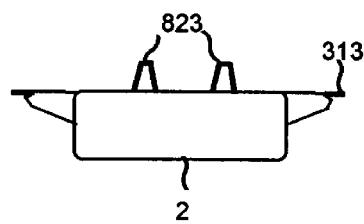
FIG. 25(a)  FIG. 25(b)
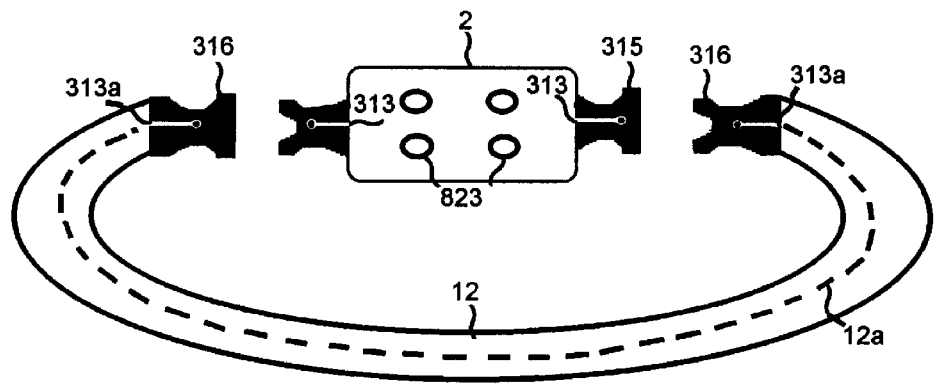
FIG 26
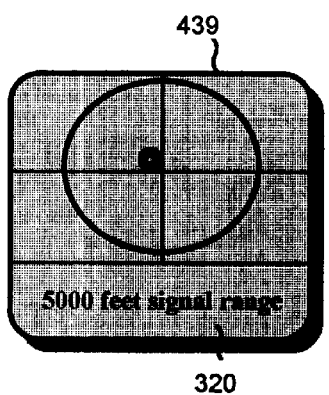 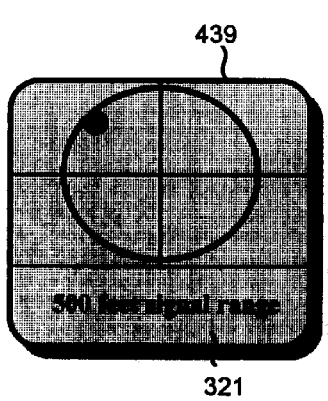 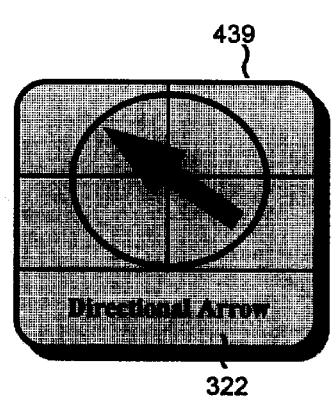
FIG. 27(a)  FIG. 27(b)  FIG. 27(c)

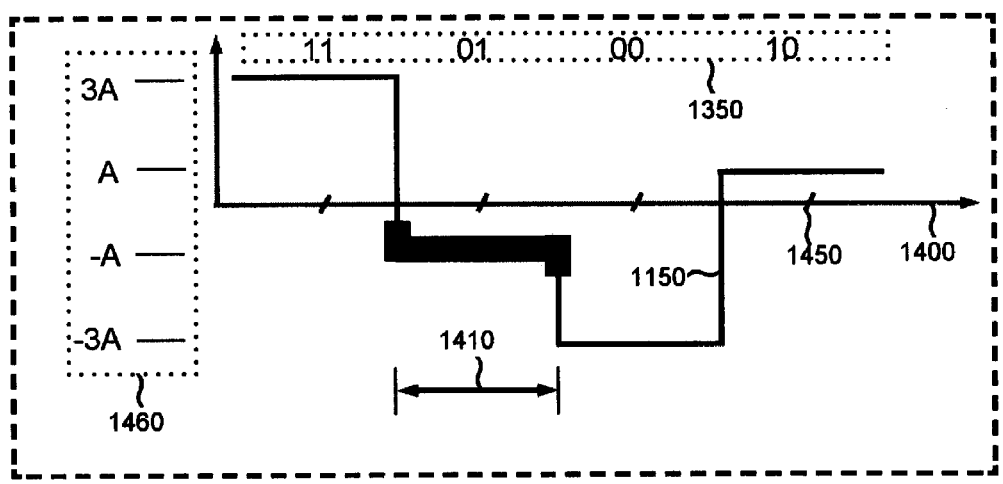
FIG. 36
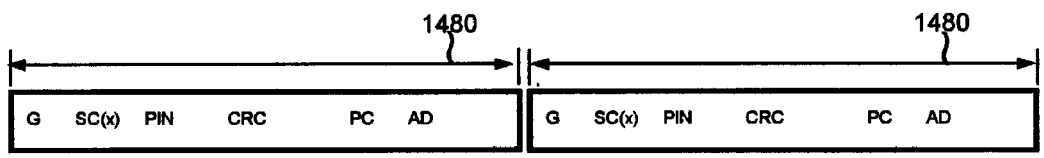
FIG. 37
|  | SC(1) | SC(5) | SC(9) | SC(13) |
|---|---|---|---|---|
| 1490 | SC(2) | SC(6) | SC(10) | SC(14) |
|  | SC(3) | SC(7) | SC(11) | SC(15) |
|  | SC(4) | SC(8) | SC(12) | SC(16) |
FIG. 38

METHOD AND APPARATUS FOR CONFINING ANIMALS AND/OR HUMANS USING SPREAD SPECTRUM SIGNALS

FIELD OF THE INVENTION

This invention relates to an electronic confinement arrangement for animals and/or humans, and more particularly to a wire fence confinement arrangement which utilizes a boundary antenna to transmit and receive spread spectrum modulated signals that activate a transceiver positioned on an animal and/or human. This invention also utilizes an antenna array and portable spread spectrum tracking transceiver for indicating the specific whereabouts and telemetry readings of contained or escaped animals and/or humans being monitored.

BACKGROUND OF THE INVENTION

Spread spectrum communications involve signaling techniques which greatly expand the transmitted spectrum relative to the data rate. The term "spread spectrum" is used to describe a class of modulation techniques in which the data stream is coded in such a way that the total information rate is higher than the data rate. In spread spectrum techniques, by a substitution of the basic RF modulator with a modulator capable of generating waveforms with an information rate orders of magnitude higher than that of the data flow, a dramatic increase in transmission properties and system capability is obtained.

In a spread spectrum system, the basic idea is to replace a single data bit with a coded waveform. This data bit can then be detected optimally when this code is known to the receiver. The transmission is more secure when the code is more complicated and well designed.

In spread spectrum modulation systems, unauthorized listening is discouraged by making it difficult to receive the signal without knowing the modulation code. Only a receiver matched to the code is useful. Authentication requires that only the transmitter knowing the code will be able to generate the code which will pass into the receiver that is matched for the same code.

Spread spectrum techniques can improve the reliability of transmission in frequency-selective fading and multipath environments. Spreading the bandwidth of the transmitted signal over a wide range of frequencies reduces its vulnerability to interference and often provides some diversity gain at the receiver. Protection against interference is carried out in a similar way to discourage unauthorized listening, as the interference will usually be correlated with the code only to a very limited extent. As a consequence, the matched receiver will not respond to the interference. When an interference signal has some characteristic properties, these can be exploited by making the receiver nonsensitive to this specific interference by using the proper code and modulation.

A spread spectrum transmission is very hard to detect because the probing receiver is not matched and therefore is insensitive to coded transmissions. Consequently, for a system which is only allowed to radiate a certain maximum spectral density, the total power transmitted may be increased because the coded waveform is spread in the frequency domain. Thus, the total received power per data bit and the overall system signal/noise ratio may be increased without the transmission interfering with other links or becoming more vulnerable to detection.

Spread spectrum modulation techniques may be used to construct very precise ranging of an animal and/or human that is being monitored. A spread carrier, modulated with a pseudorandom noise (PN) sequence, permits the receiver to very precisely measure the time the signal was sent; thus, spread spectrum can be used to determine the distance to a transmitter for ranging. For example, the distance is related to the intensity of the signal. Thus, the strength of the signal is measured and the distance is then determined based on the measured signal strength.

One system for accomplishing the confinement of an animal is disclosed in U.S. Pat. No. 5,170,149 titled CONFINEMENT ARRANGEMENT FOR ANIMALS and issued to Yarnall, Sr. et al. This and other conventional systems mount a receiver on a collar. The collar delivers a shock to an animal wearing the collar when the animal is in relatively close proximity to a perimeter antenna wire. The conventional systems are unintentionally activated, however, by common and naturally occurring sources of unmodulated radio frequencies. These sources include, for example, lightning and household electrical motors such as those motors used in hair dryers and blenders.

Another exemplary conventional system is described in U.S. Pat. No. 4,898,120 titled ANIMAL TRAINING AND RESTRAINING SYSTEM and issued to Brose. The '120 patent describes a system which includes a transmitter/receiver mounted on an animal's collar for transmitting a series of pulses. A control unit receives the transmitted pulses and provides them to an analog-to-digital (A/D) converter for converting the transmitted pulses to digital form based on the amplitude of the received pulses. A central processing unit (CPU) in the control unit uses the digital signals to define the average strength of the transmitted pulses to ascertain if the animal has approached a predetermined distance from the transmitter. The system does not distinguish the transmitted signal, however, from naturally occurring and common sources of unmodulated radio frequencies.

Another exemplary conventional system is described in U.S. Pat. No. 5,241,923 titled TRANSPONDER CONTROL OF ANIMAL WHEREABOUTS and issued to Jannings. The '923 patent describes a system that may be very expensive, as it is comprised of many transponders placed throughout the containment area. Furthermore, it is very difficult to closely define the predetermined confinement area using the transponder barrier disclosed in the '923 patent. In addition, this system has no way to track the animal wearing the confinement receiver if the animal leaves the confinement area.

Another exemplary conventional system is described in U.S. Pat. No. 5,266,944 titled ELECTRONIC SYSTEM AND METHOD FOR MONITORING ABUSERS FOR COMPLIANCE WITH A PROTECTIVE ORDER and issued to Carroll et al. The '944 patent describes a system that is comprised of many transponders, cameras, audio recorders, and is a very expensive way to monitor a human or animal. Furthermore, the transponder, worn by the human or animal being contained, cannot deter the confined subject when the subject is about to leave the predetermined confinement area. In addition, the '944 system uses an encoded, modulated signal that can be easily discovered and replicated by one who is skilled in the art.

Another exemplary conventional system is described in U.S. Pat. No. 5,460,124 titled RECEIVER FOR AN ELECTRONIC ANIMAL CONFINEMENT SYSTEM issued to Grimsley et al. The '124 patent utilizes an AM modulated signal that is transmitted through the predetermined confinement area antenna. The use of an orthogonal antenna system increases the size and manufacturing cost of the receiver antenna section. Furthermore, the '124 patent determines the efficiency of a modulation scheme by examining the energy concentration of the signal for a given rate of information. While the compactness of the signals appeals to the conventional wisdom, it has been found that the use of spread spectrum transmissions modulations takes the opposite approach by spreading the signal over a very wide bandwidth. In addition, anyone skilled in the art can quickly decipher the encoded AM modulated signal of the system disclosed in the '124 patent.

The foregoing illustrates the limitations known to exist in present confinement systems. Thus, it would be advantageous to provide an alternative confinement system which (1) uses a more effective and non-decipherable means of signal transmission accomplished by the use of spread spectrum techniques; (2) accounts for common and naturally occurring sources of unmodulated radio frequencies; (3) allows for the tracking of one or more Personal Monitoring Units (PMUs) within the confinement and/or monitoring area(s) or after the animal or human being monitored has left the predefined confinement area; (4) allows the owner or guardian to program each PMU with a Personal Identification Number (PIN) so that only the owner or guardian can track the animal or human; and (5) incorporates further energy saving methods for extended battery life of the PMU and constant voltage levels to the PMU's circuitry.

SUMMARY OF THE INVENTION

The present invention provides an animal confinement arrangement including a home base for transmitting a spread spectrum modulated signal and a receiver for receiving the spread spectrum modulated signal. The received wideband signal is translated to a baseband (common) frequency. A correlator mixes the baseband oscillator with the pseudo-random noise (PN) source and then mixes the result against the incoming baseband radio frequency (RF). The synchronization process keeps the PN sequence in step by varying the clock for optimal lock. After mixing, the information is contained as a digital output signal and all interference is spread to noise. The low-pass filter removes some of this noise. The spread spectrum modulated signal is passed through a wideband RF amplifier. The signal then goes through a preamble acquisition and synchronization stage that triggers the beginning of the hopping mode and keeps the receiver channel changes in step with the transmitter. The signal is then despread demodulated. The demodulated signal is compared to a reference signal to produce a comparator signal indicating whether the received modulated signal was transmitted by the home base. Deterrent circuitry is provided which is responsive to a strength of the received modulated signal for producing a deterrent signal. The deterrent signal is applied to an animal if the comparator signal indicates that the received modulated signal was transmitted by the home base.

In another exemplary aspect of the present invention, the modulated spread spectrum signal transmitted from the home base is discretely encoded with a digital signal. The received discretely encoded modulated spread spectrum signal is despread demodulated and the discretely encoded digital signal is deciphered and recovered in the receiver. The deterrent circuitry, in response to the strength level of the received modulated signal and the digital code, produces a deterrent signal that is applied to the animal if the digital signal was transmitted from the home base.

In another exemplary aspect of the present invention, a confinement arrangement including a home base transmitter for transmitting spread spectrum modulated signals is provided. A first wire defines a confinement area and receives and emits a first modulated signal. A second wire within the confinement area and adjacent to the home base receives and emits a second spread spectrum modulated signal with a separate discretely encoded word or series of words. A receiver attached to an animal detects a first, low strength level of the first spread spectrum modulated signal from the first wire and activates deterrent devices on the collar. If the animal continues toward the first wire, the receiver also detects a second, higher strength level of the first spread spectrum modulated signal from the first wire and activates an alarm signal to the home base and disconnects the deterrent circuits. If the animal approaches the second wire, the receiver detects the second spread spectrum modulated signal and reactivates the deterrent circuits, thereby reconfining the animal.

In another exemplary aspect of the present invention, a portable collar communicator that utilizes discrete spread spectrum transmission techniques is included in the receiver located inside the Personal Monitoring Unit (PMU). The owner or guardian is able to communicate with the animal or human via a microphone positioned at the home base or through a portable unit. The output of the microphone is converted, amplified, combined with a spread spectrum modulated frequency, and then transmitted to the PMU through a spread spectrum transmitter. In response to detection of the owner's or guardian's modulated voice signal, a communicator circuit in the PMU converts the transmitted voice signal, thereby enabling the animal or human to hear the transmitted voice. The communicator circuit, inside the PMU, includes a power saver circuit permitting use of the communicator circuit without consuming excessive energy from the PMU's power supply.

In another exemplary aspect of the present invention, a battery manager allows a constant predetermined voltage level to be supplied to the PMU circuitry as the voltage levels of the battery drop due to usage.

In another exemplary aspect of the present invention, a Personal Tracking Unit (PTU) utilizes a directional antenna array allowing the owner or guardian to track one or more PMUs by receiving the signal and then displaying the direction and other predetermined data on an LCD and/or light emitting diode (LED) array. The spread spectrum detection circuitry also indicates the approximate distance the PTU is from the PMU(s).

In another exemplary aspect of the present invention, a PMU is equipped with a spread spectrum location beacon transmission timer that allows signal transmission for a predetermined amount of time and/or number of times per minute, after the PMU has received the predetermined encoded signal from the PTU, additional land base regional antenna arrays, or low earth orbiting satellites. This energy saving device greatly conserves energy consumption of the PMU's battery.

In another exemplary aspect of the present invention, the monitoring system is coupled with a personal computer to display the locations of the PMUs being monitored.

The foregoing and other aspects of the present invention will become apparent from the following detailed description of the invention when considered in conjunction with the accompanying drawing.

BRIEF DESCRIPTION OF THE DRAWING

FIG. 25(a) is a top view of a PMU in accordance with the present invention.

FIG. 25(b) is a side view of the PMU shown in FIG. 25(a).

FIG. 26 is a schematic illustration of a PMU combined with an external antenna port in accordance with the present invention.

FIG. 27(a) is an exemplary long range display on an LCD screen in accordance with the present invention.

FIG. 27(b) is an exemplary medium range display on an LCD screen in accordance with the present invention.

FIG. 27(c) is an exemplary directional arrow display on an LCD screen in accordance with the present invention.

FIG. 36 is a graphical representation of data vs. time for a quaternary encoded signal in accordance with the present invention.

FIG. 37 is an illustration of the repeated transmission of the encoded word of FIG. 2.

FIG. 38 is an illustration of techniques of selecting a predetermined sequence of security codes in accordance with the present invention.

DESCRIPTION OF PREFERRED EMBODIMENTS AND BEST MODE

Overview

Figure 1:
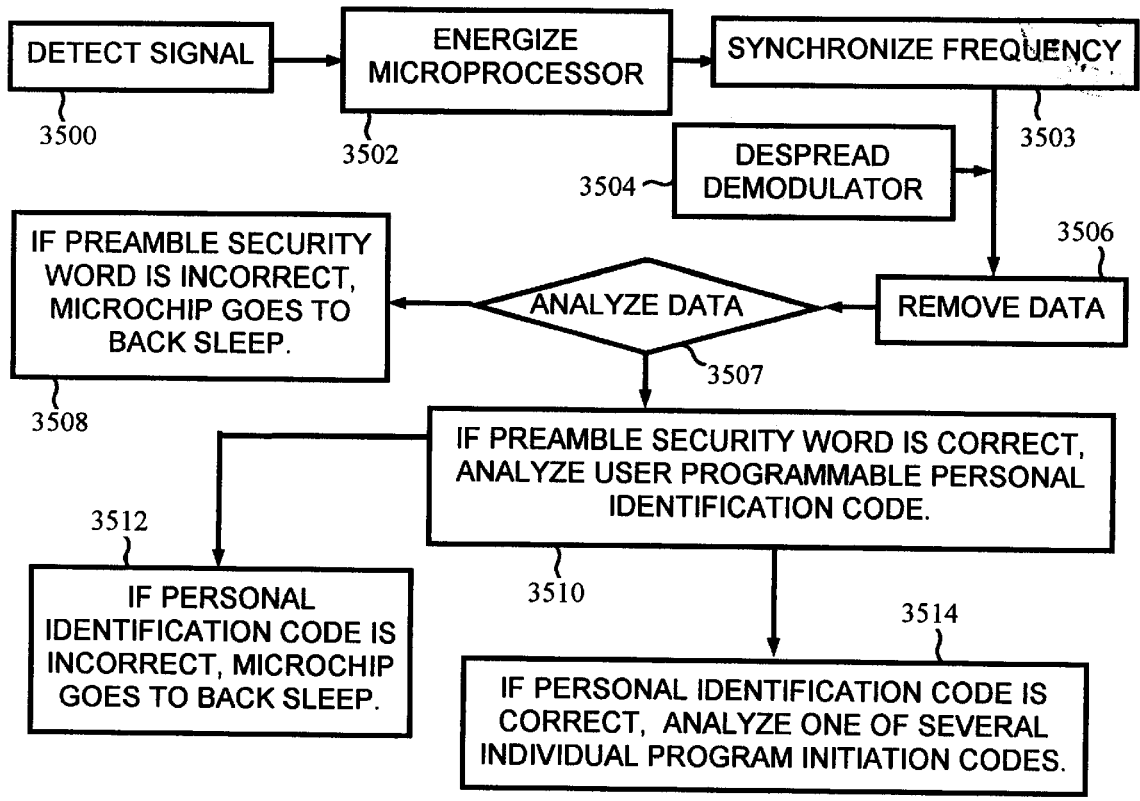
FIG. 1 is a flow diagram illustrating the operation of a microprocessor of a receiver in accordance with the present invention.

An exemplary confinement system in accordance with the present invention is explained in general terms with reference to the flow diagram in FIG. 1. The confinement system for animals of the present invention operates by transmitting a first, predetermined spread spectrum modulated signal to a receiver mounted on an animal's collar. The transmitted signal may contain, for example, the encoded word 1480 shown in FIG. 2. The receiver detects the signal (3500) and a microprocessor contained within the receiver is energized (3502). The frequency is synchronized (3503), the spread spectrum modulated signal is despread and demodulated (3504), and the data on the signal is removed (3506) and is deciphered by the receiver to determine if the received signal is the correct discrete spread spectrum modulated signal (3507).

Figure 2:
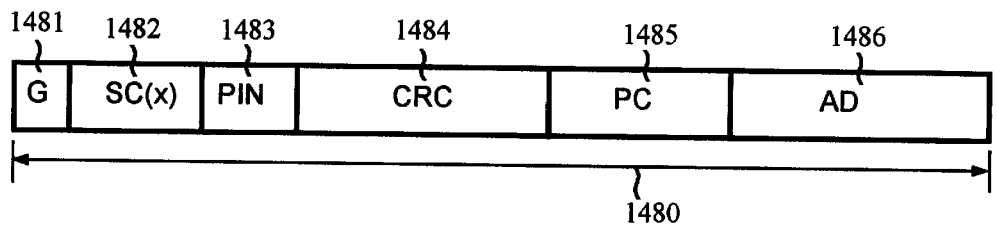
FIG. 2 is an illustration of an encoded word in accordance with the present invention.

A preamble security word (SC(x) 1482 in FIG. 2) is transmitted and, if it is incorrect (i.e., if the spread spectrum modulated and reference signals are not similar), then the first signal is ignored and the microprocessor is deenergized (3508). If the preamble security word is correct (i.e., if the demodulated and reference signals are similar), however, then a user programmable personal identification code (PIN 1483 in FIG. 2) is analyzed (3510). If the personal identification code is incorrect, then the microprocessor is deenergized (3512). If the personal identification code is correct, then the program initiation code (PC 1485 in FIG. 2) is analyzed (3514) and the proper routine is then initiated to use the signal strength to determine whether the animal is close to a boundary area. The program initiation code refers to the individual code given to each particular routine, such as warning of the monitored animal or human approaching the outer perimeter described using FIG. 3 or a predetermined danger area described using FIG. 4.

Figure 5:
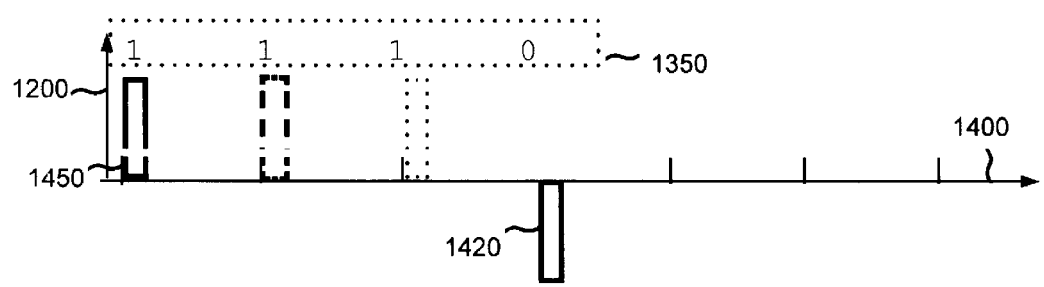
FIG. 5 is a graphical representation of data vs. time for an impulse data stream digital data code that may be transmitted in accordance with the present invention.
Figure 6:
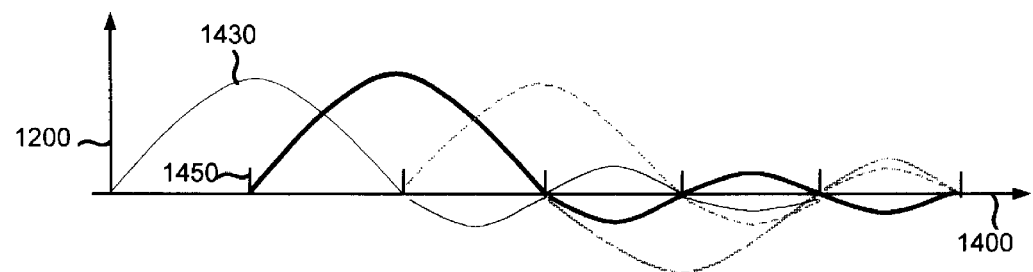
FIG. 6 is a graphical representation of data vs. time for an individual pulse waveform that may be transmitted in accordance with the present invention.
Figure 7:
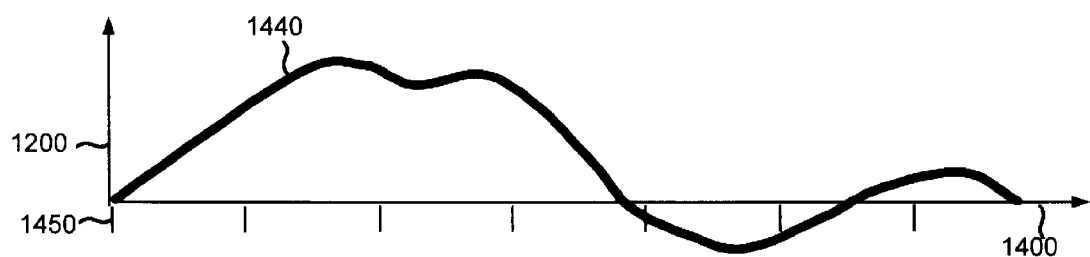
FIG. 7 is a graphical representation of data vs. time for a baseband signal that may be transmitted in accordance with the present invention.
Figure 8:
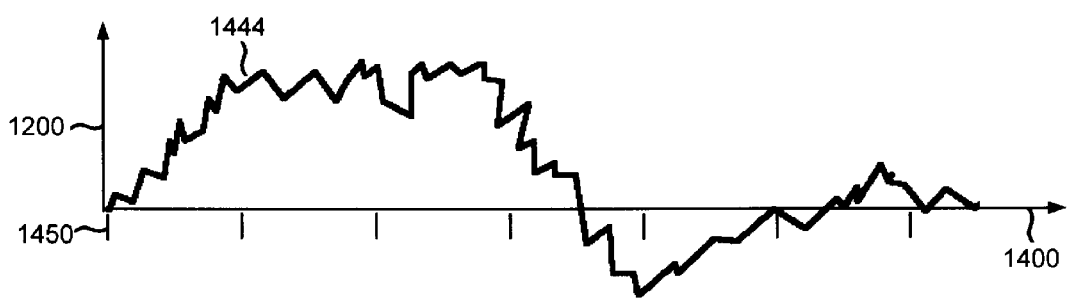
FIG. 8 is a graphical representation of data vs. time for noise that may be transmitted in accordance with the present invention.
Figure 9:
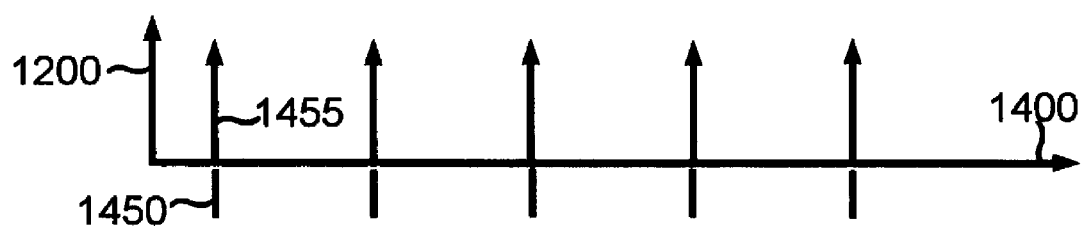
FIG. 9 is a graphical representation of data vs. time for a sampling instant that may be transmitted in a signal in accordance with the present invention.
Figure 10:
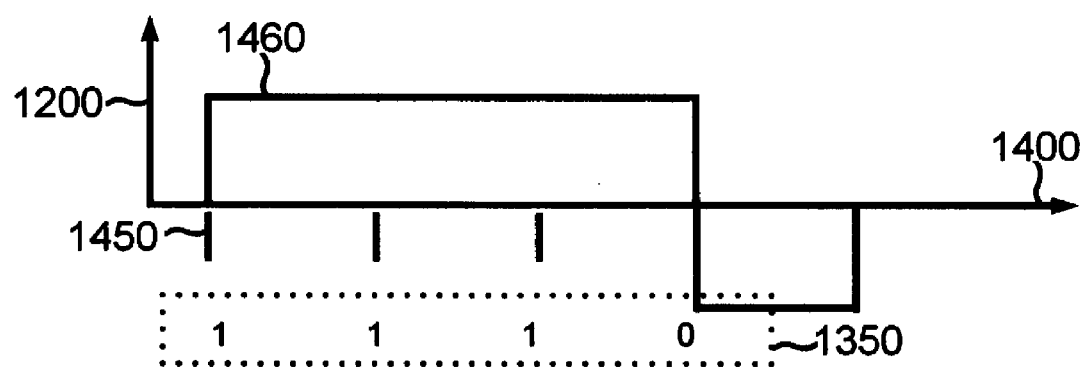
FIG. 10 is a graphical representation of data vs. time for recovered nonreturn to zero (NRZ) pulses and digital data that may be transmitted in accordance with the present invention.

FIGS. 5–7 illustrate the conversion and transmission of data 1200 vs. time 1400 and FIGS. 8–10 illustrate the received transmission and its conversion back to data. Each pulse 1420 shown in FIG. 5 corresponds to a one or zero and the stream of pulses 1420 represents digital data code 1350. The incoming signal is sampled at interval 1450. At the instant one pulse 1420 is sampled, the end from all preceding pulses has a zero value. Thus, previous pulses cause zero intersymbol interference (zero ISI) at the sampling instant. FIG. 6 shows the individual pulse waveform 1430 corresponding to the pulses 1420 shown in FIG. 5. FIG. 7 shows the baseband signal 1440 transmitted where the baseband is a combination of the individual pulse waveforms 1430.

FIG. 8 illustrates the received signal 1444 received by a transmitter where the received signal 1444 is a combination of the baseband signal 1440 and noise. FIG. 9 shows the sampling instant 1455 at which the received signal 1444 is sampled. FIG. 10 shows the recovered non return to zero (NRZ) pulses 1460 recovered from the received signal 1444 and digital data code 1350 corresponding to the NRZ pulses.

FIG. 2 illustrates an encoded word 1480 corresponding to the digital data code 1350 shown in FIGS. 5 and 10. G 1481 represents the guard time preceding the word. SC(x) 1482 represents the predetermined security code or serial number of the transmitter. The security code is preferably programmed at the time of manufacturing, but may also be programmed by the user. PIN 1483 represents the optional personal identification code that can be programmed by the owner or guardian. CRC 1484 represents carrier and bit timing recovery sequence. PC 1485 represents the program initiation code. AD 1486 represents the additional data section of the word.

By utilizing spread spectrum transmissions and discrete encoding techniques, communications signals can be greatly increased in bandwidth (by factors of 10 to 10,000) when combining them with binary sequences using several techniques that are described below. The result of this spreading has two beneficial effects. The first effect is dilution of the signal energy so that, while occupying a very large bandwidth, the amount of power density present at any point within the spread signal is very slight. The amount of signal dilution depends on several factors such as transmitting power, distance from the transmitter, and the width of the spread signal. The dilution may result in the signal being below the noise floor of a conventional receiver, and thus invisible to it, while it can be received with a spread spectrum receiver.

Figure 11:
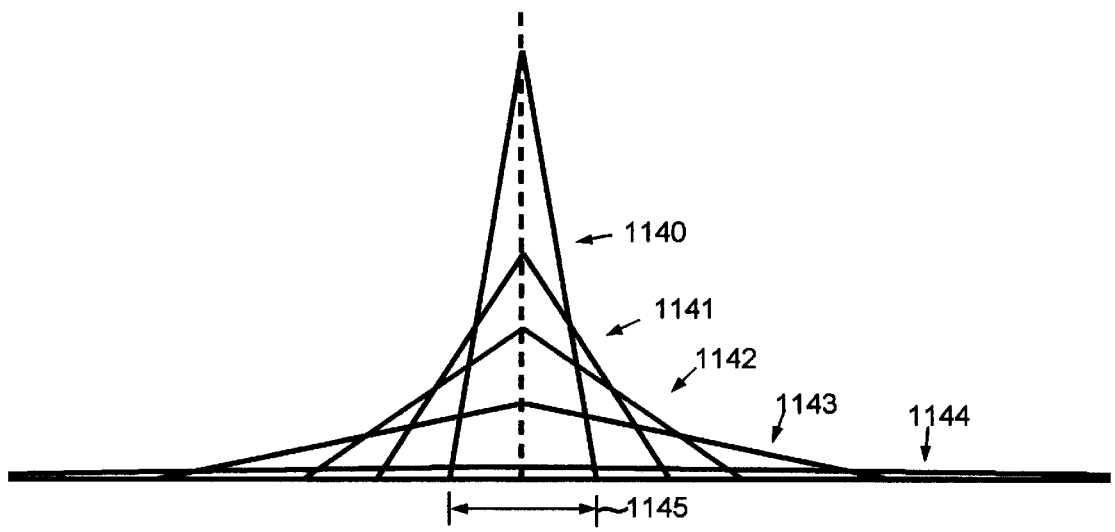
FIG. 11 is a graphical representation of a power distribution with respect to signal bandwidth of a signal in accordance with the present invention.

FIG. 11 shows a graphic representation of the distribution of power as the signal bandwidth increases. The unspread signal 1140 contains most of its energy 1145 around a center frequency. As the signal strength 1141 bandwidth increases, the power about the center frequency falls. At signal strength 1142 and signal strength 1143, more energy is being distributed in the spread spectrum signal's wider bandwidth. At signal strength 1144, the energy is diluted as the spreading achieves a very wide bandwidth. Bandwidths average twice the bit speed of the PN code generator.

Figure 12:
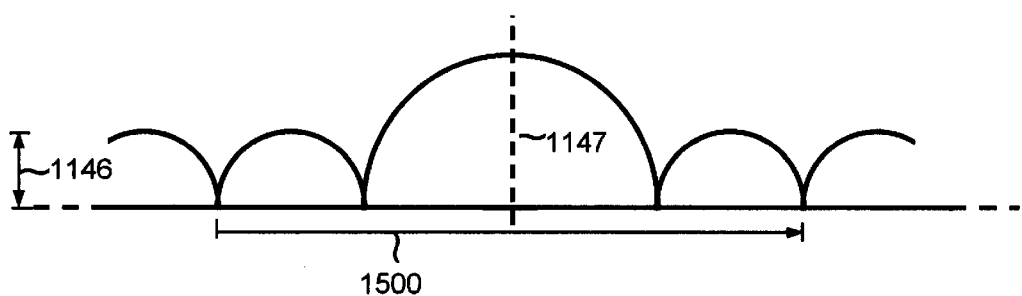
FIG. 12 is a graphical representation of power vs. frequency for direct-sequence-modulation spread spectrum signals in accordance with the present invention.
Figure 13:
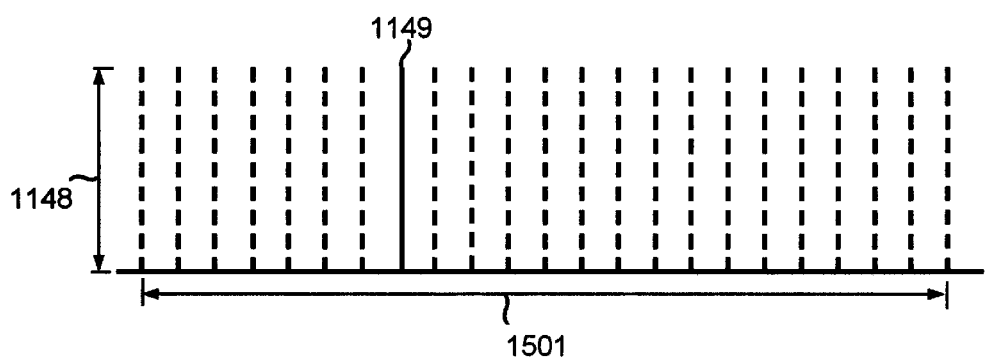
FIG. 13 is a graphical representation of power vs. frequency for frequency hopping spread spectrum signals in accordance with the present invention.

FIG. 12 illustrates power 1146 vs. frequency 1500 for a direct-sequence-modulation spread spectrum signal. The signal 1147 shows a sampling reading at a particular instant. The envelope takes the shape of a sin $x^2$ divided by x curve. FIG. 13 illustrates power 1148 vs. frequency 1501 for frequency-hopping spread spectrum signals. The signal 1149 shows a sampling reading at a particular instant. Emissions jump around in a pseudo-random fashion to discrete frequencies. A time-hopping spread spectrum signal can also be used.

The second beneficial effect of the signal spreading process is that the spread spectrum receiver may reject strong undesired signals, including those much stronger than the desired spread spectrum signal power density. This is because the desired receiver has a copy of the spreading sequence and uses it to "despread" the signal. Non-spread signals are then suppressed in the processing. Conventional signals such as narrow-band frequency modulated (FM), single-sideband (SSB) modulated, and continuous wave (CW) are rejected, as are other spread spectrum signals not bearing the desired PN coding sequence. The result is a type of private channel, one in which only the spread spectrum signal using the same PN sequence will be accepted by the spread spectrum receiver. As a result, multiple transmission conversation may take place between the system and monitoring units worn by animals and/or humans.

The use of different binary sequences such as the preamble security word SC(x) 1482 allows several spread spectrum systems to operate independently of each other within the same band. This is a form of sharing called code-division multiple access. This allows more signals to be packed into a band.

Spread spectrum possesses a number of additional advantages. Spread-spectrum provides a degree of protection against fading (a large variation in received signal strength caused by reflections, as in TV "ghosts"). Frequency-selective fading typically affects a relatively narrow band of frequencies. The spread carrier offers a form of frequency diversity that can offset the faded frequencies by those within the spread spectrum signals that do not experience the same fading. The effects of reflective or multipath interference, which result from several parts of the same signal arriving at the spread spectrum receiver at slightly different times, can be largely reduced. Signals that arrive late at the spread spectrum receiver will not match the spreading code currently being used to decode the signal. Hence, they are rejected as interference.

Description of Exemplary Embodiments

Figure 14:
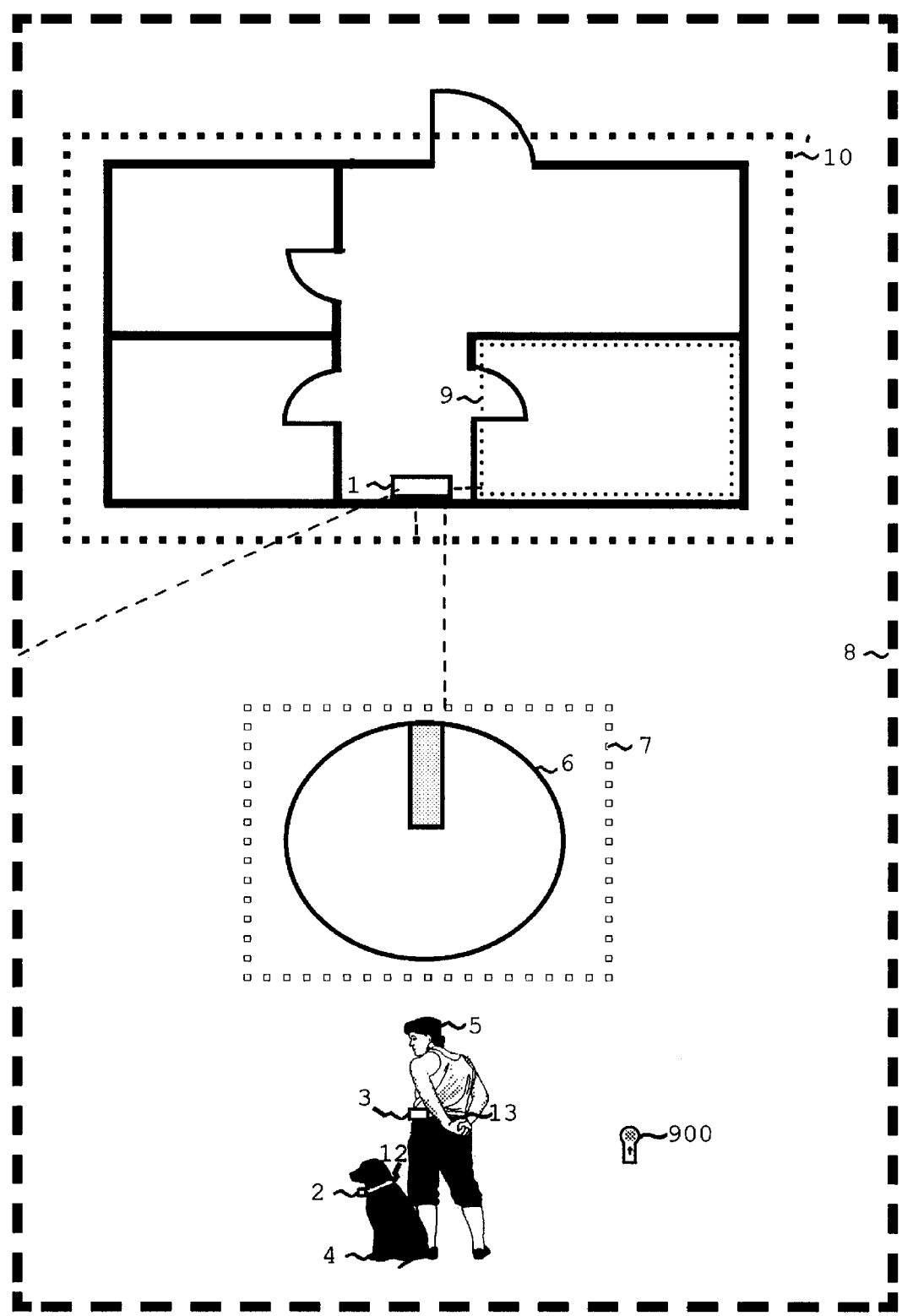
FIG. 14 is a schematic illustration of an exemplary confinement system in accordance with the present invention.

Referring to FIG. 14, there is shown a home base 1 which includes a transmitter for transmitting first through seventh, predetermined discrete spread spectrum modulated signals, (A)–(G), respectively, which are different from one another. A main control post (not shown) can be provided to monitor the home base transmitter. Components are powered by power supplies but connections have been omitted for clarity of the drawings.

A first signal (A) is transmitted from a first signal-emitting wire 8 that is disposed around a confinement area. A second signal (B) is transmitted from a second signal-emitting wire 10 that is disposed within the confinement area and can enclose or be adjacent to the building or residence in which home base 1 is located. A third signal (C) is transmitted from a signal-emitting wire 7 that is disposed within the confinement area around any predetermined danger areas, e.g., in the case of small children, a swimming pool 6. Wire 7 can be placed around many other different danger zones such as wells and machinery. A fourth signal (D) is transmitted from a signal-emitting wire 9 is disposed within the confinement area, inside a building or outside. This signal emitting wire 9 is designated for safety zone areas, allowing the owner or guardian to determine which zone the animal or human wearing the Personal Monitoring Unit (PMU) is in. Wires 7–10 can be above ground or buried under ground.

A fifth signal (E) can be transmitted from each of the signal-emitting wires 7–10. This signal (E) is designated for encoded spread spectrum voice communications between the home base 1 and Portable Tracking Units (PTU) 900, and the PMUs 2 and 3.

A sixth signal (F) can be transmitted from each of the signal-emitting wires 7–10. This signal (F) is designated for anti-bark deterrent activation of the PMU 2. The anti-bark deterrent section of the PMU 2 may be activated from the home base 1 and Portable Tracking Units (PTU) 900 via transmission of a predetermined encoded spread spectrum signal.

A seventh signal (G) can be transmitted from each of the signal-emitting wires 7–10, PTU 900, additional land base regional antenna arrays (not shown), and low earth orbiting satellites (not shown). This signal (G) is designated for activation of the PMU's proximity beacons (not shown), allowing the guardian or owner to track the whereabouts of one or more PMUs 2 and 3.

Figure 15:
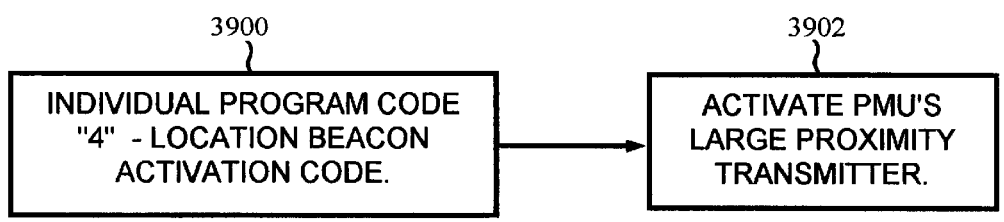
FIG. 15 is a flow diagram illustrating the operation of a receiver responding to a location beacon activation code signal in accordance with the present invention.

FIG. 15 is the logic flow chart illustrating the operation of the PMU 2 receiver in response to the location beacon activation code "4" transmitted in the signal from antenna wire 7, 8, 9, 10, and 422. Referring to FIG. 15, when the program initiation code is determined to be the "location beacon activation code" (3900), the PMU's 2 and 3 large proximity transmitter is activated (3902).

An animal 4 (or human 5) to be kept within the confinement area carries a PMU 2 (or 3). The invention as described below operates when used in conjunction with confining an animal 4 or a human 5. The animal 4 wears a PMU 2 attached to collar 12 and the human 5 wears a PMU 3 attached to a belt 13. The PMU 3 operates in the identical fashion as the PMU 2.

Figure 3:
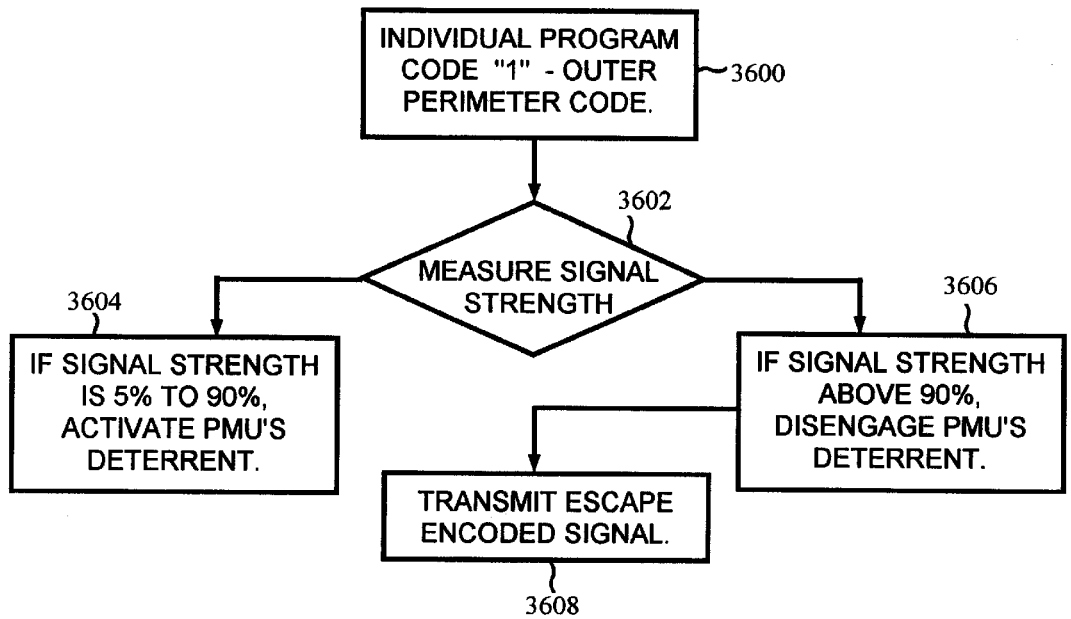
FIG. 3 is a flow diagram illustrating the operation of a receiver responding to an outer perimeter containment wire signal in accordance with the present invention.

The PMUs 2 and 3 are responsive to the first through seventh signals (A)–(G). FIG. 3 is the logic flow chart of the PMU 2's receiver in response to the program code "1" responding to the outer perimeter containment wire 8's signal. Referring to FIG. 3, when the program initiation code (first signal (A)) is determined to be the "outer perimeter code" (3600) that has been emitted from wire 8, the signal strength is measured (3602). The strength of the emitted signal varies with the distance from wire 8, as is well known. As the animal 4 or human 5 approaches wire 8, the strength of the signal continuously increases and as the animal 4 or human 5 departs from wire 8 the strength of the signal decreases. The PMU 2 or 3 has a deterrent circuit responsive to a first strength level of signal (A) which is preferably between 5% and 90% of the predetermined transmission wattage of signal (A). If the signal strength is between the predetermined range, e.g., 5% and 90%, the deterrent of the PMU 2 or 3 is activated (3604). Once the first strength level of signal (A) is detected, the signal is despread, the encoded sequence verifies that it is authentic, and then the deterrent circuit produces a deterrent, including an electrical shock, audio, and/or vibration, which all act upon the animal 4 or human 5 to desirably drive the animal 4 or human 5 back toward the center of the confinement area.

If the animal 4 or human 5 ignores the deterrent and continues toward wire 8, the PMU 2 activates the alarm and the disconnect circuit. The alarm and disconnect circuit are responsive to a second strength level of the first signal (A) which is preferably 95% or higher of the predetermined transmission wattage of signal (A). After the second strength level of the first signal (A) is detected, the alarm and disconnect circuit disconnects the deterrent of the PMU 2 or 3 (3606), so that the animal 4 or human 5 no longer receives the deterrent, and it may wander outside the confinement area. The term "disconnect" herein refers to an electrical deactivation. Simultaneously with the disconnect, the PMU 2 or 3 broadcasts an alarm activation encoded spread spectrum eighth signal (H) back to the home base 1 (3608), warning the owner that the animal 4 or human 5 has ignored the deterrent and is escaping. The eighth predetermined discrete spread spectrum modulated signal (H) has a different encoding from the predetermined spread spectrum modulated signals (A) through (G).

After the animal 4 or human 5 escapes, it may desire to return to the home base 1 or to the confinement area, due to habit or action of the owner, or for other reasons. The PMU 2 contains a reconnect circuit (not shown) responsive to signal (B), signal (C), or signal (D). Once the animal 4 approaches wire 7, or wire 10, or wire 9 and the strength level of signal (B), signal (C) or signal (D) is detected, then the signal is despread, the encoded sequence is verified, and the reconnect circuit reactivates the deterrent, thereby reconfining the animal 4 or human 5.

Similar to wire 8, the strength of the signal (C) emitted from wire 7 varies with the distance from wire 7. As the animal 4 or human 5 approaches wire 7, the strength of the signal continuously increases and as the animal 4 or human 5 departs from wire 7 the strength of the signal decreases. The PMU 2 or 3 has a deterrent circuit responsive to a strength level of signal (C) which is preferably at least 5% of the predetermined transmission wattage of signal (C). Once the first strength level of signal (C) is detected, the signal is despread, then the encoded sequence is verified and the deterrent circuit produces a deterrent, including an electrical shock, audio, and/or vibration, which acts upon the animal 4 or human 5 to, it is hoped, drive the animal 4 or human 5 away from the danger area 6. In addition, the PMU 2 or 3 transmits "Danger Area Alarm" spread spectrum encoded signal (I) which is received by the antenna wire 7 and provided to the home base 1. The ninth predetermined discrete spread spectrum modulated signal (I) has a different encoding from the predetermined spread spectrum modulated signals (A) through (H).

Figure 4:
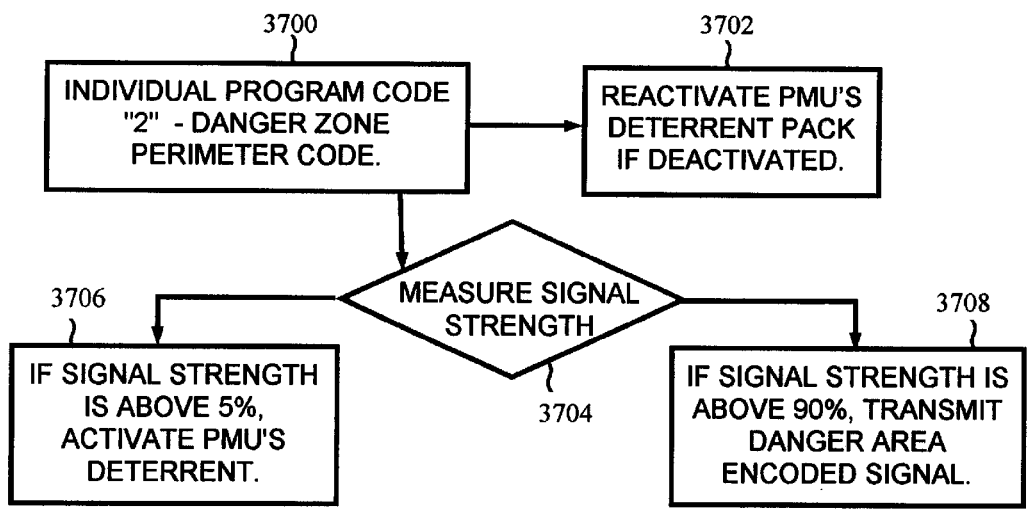
FIG. 4 is a flow diagram illustrating the operation of a receiver responding to a danger zone wire signal in accordance with the present invention.

FIG. 4 is the logic flow chart of the operation of PMU 2 or 3 in response to the signal danger perimeter wire 7 including a program code "2". Referring to FIG. 4, when the program initiation code is determined to be the "danger zone perimeter code" (3700), the deterrent of the PMU 2 or 3 is reactivated if it had been deactivated (3702) and the signal strength is measured (3704). If the signal strength is above a first predetermined level, e.g., 5%, then the deterrent of the PMU 2 or 3 is activated (3706). If the signal strength is above a second predetermined level, e.g., 90%, then a "danger" signal is encoded and transmitted to the (3708) from the PMU 2 or 3.

As with wires 7 and 8, the strength of the emitted signal from wire 9 varies with the distance from wire 9. As the animal 4 or human 5 approaches wire 9, the strength of the signal continuously increases and as the animal 4 or human 5 departs from wire 9 the strength of the signal decreases. The PMU 2 or 3 has a deterrent responsive to a first strength level of signal (D) which is preferably 5% or higher of the predetermined transmission wattage of signal (D). Once the strength level of signal (D) is detected, the signal is despread, then the encoded sequence is verified and the deterrent circuit then transmits predetermined data such as the PMU identification number, telemetry data, PMU self testing system performance test data, or the like on signal (J). The tenth predetermined discrete spread spectrum modulated signal (J) has a different is encoding from the predetermined spread spectrum modulated signals (A) through (I).

Figure 16:
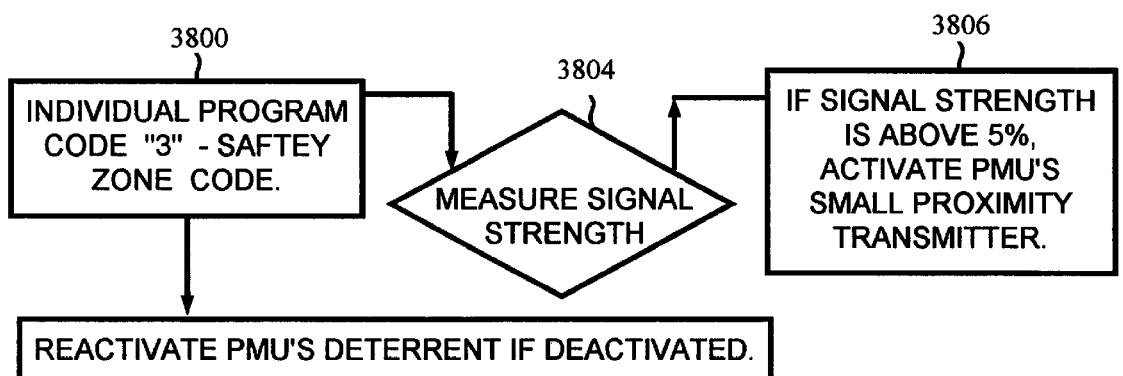
FIG. 16 is a flow diagram illustrating the operation of a receiver responding to a safety zone wire signal in accordance with the present invention.

FIG. 16 is the logic flow chart of the PMU 2's receiver in reference to the program code "3" responding to the safety zone wire 9's signal.

Referring to FIG. 16, when the program initiation code is determined to be the "safety zone code" (3800), the PMU's deterrent is reactivated if it had been deactivated (3802) and the signal strength is measured (3804). If the signal strength is above a predetermined level, e.g., 5%, then the PMU's small proximity transmitter is activated (3806).

The levels of shock deterrent applied by the PMU 2 or 3 are modified by adding an encoded word in the signals transmitted by the home base 1.

Each PMU 2 or 3 contains a unique ID number. When a new PMU 2 or 3 is added to an existing system, the home base 1 is put into a "learn" mode. The learn mode retrieves the unique ID number from the new collar or belt, and adds it to a list of present collars and belts on the system. The home base 1 also asks for certain information about the newly added collar or belt, such as:

1. Shock levels,
2. Approximate "wake-up" distance from the fence,
3. Approximate "escape" distance from the fence,
4. Enable collar communicator upon escape (Y/N), and
5. Collar communicator enabled (Y/N).

This information is referred to collectively as PMU characteristics.

The code identifying the present home base 1 is also downloaded into the PMU 2 or 3 during the "learn" session so that the PMU 2 or 3 recognizes future transmissions from the home base 1. Under normal operation, the home base 1 may continuously transmit the predetermined PMU characteristics for each PMU 2 or 3 as transmitted signals. The data is transmitted as a serial data word, one for each collar or belt on the system. Various types of transmission formats can be employed to transmit the serial data such as: spread spectrum, phase shift keying (PSK), frequency shift keying (FSK), binary phase shift keying (BPSK), quadrature phase shift keying (QPSK), amplitude shift keying (ASK), and quadrature amplitude shift keying (QAM). This is only a partial list of the numerous types of modulation techniques. When the collar or belt detects enough fence energy to wake up, it compares the address transmitted from the home base 1 to the preloaded home base address entered during the learn session. If there is a match, the collar or belt receives the set-up information being transmitted by the home base 1. These settings are then stored in an internal memory in the collar or belt. The settings are verified upon each wake up and match of the home base address.

Figure 17:
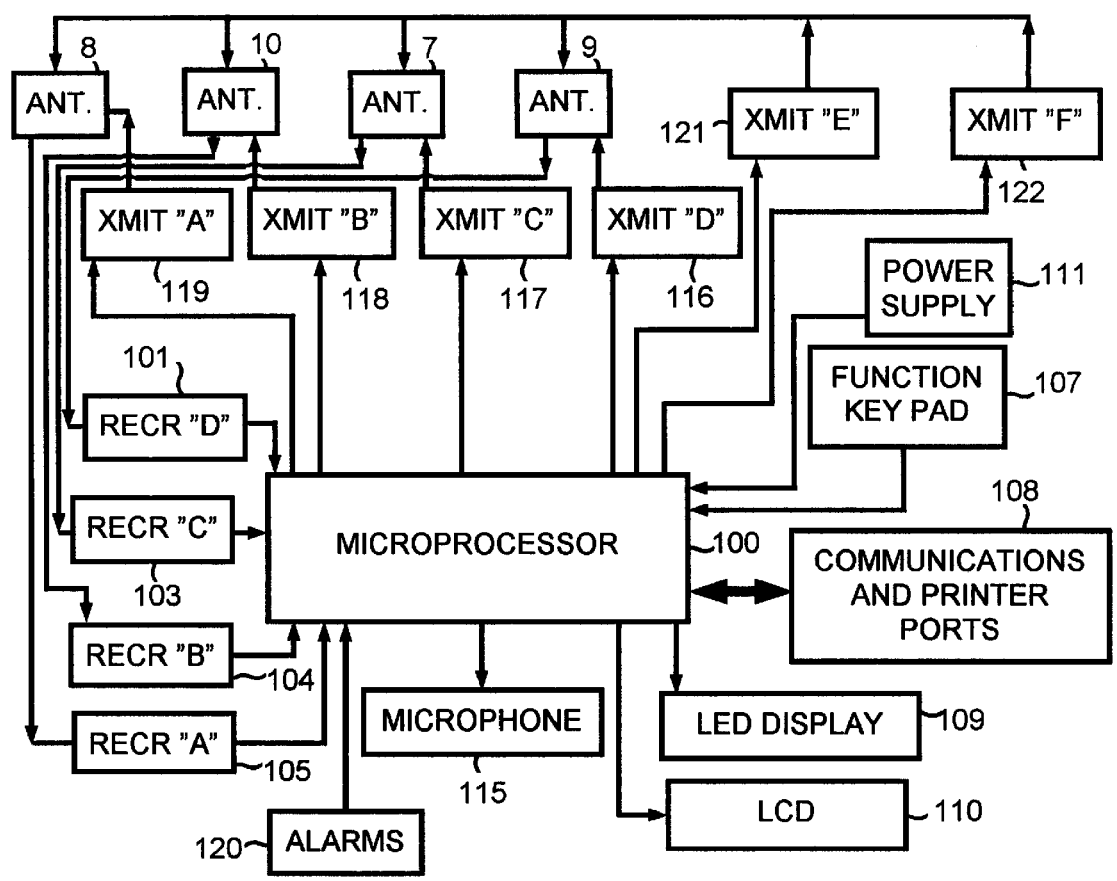
FIG. 17 is a block diagram of an exemplary circuit of a home base transmitter and receiver in accordance with the present invention.

Referring to FIG. 17, an exemplary circuit for home base 1 is shown. The home base 1 is powered by a power supply 111, typically a DC electrical power. The home base 1 includes a function key pad 107 that allows the owner or guardian to program private serial numbers and Personal Identification Numbers (PINs) into a microprocessor 100. This data is sent to transmitter XMIT "A" 119 (e.g., Part No. RF 2423, manufactured by RF Micro Devices, Greenwood, N.C.) where the data is discretely encoded, converted to a spread spectrum signal, and broadcast as the outer perimeter confinement signal (A) through antenna 8. The detailed workings of XMIT "A" 119 are disclosed in T1 of FIG. 18.

In addition, the microprocessor 100 sends data to transmitter XMIT "B" 118 where the data is discretely encoded, converted to a spread spectrum signal, and broadcast as outer building perimeter confinement signal (B) through antenna 10. The microprocessor 100 also sends data to transmitter XMIT "C" 117 where the data is discretely encoded, converted to a spread spectrum signal, and broadcast as danger zone perimeter signal (C) through antenna 7. Further, the microprocessor 100 sends data to transmitter XMIT "D" 116 where the data is discretely encoded, converted to a spread spectrum signal, and broadcast as interior safety zone perimeter signal (D) through antenna 9. The detailed workings of XMIT "B" 118, XMIT "C" 117, and XMIT "D" 116 are disclosed in T1 of FIG. 18.

A microphone 115 electronically digitizes the guardian's or owner's voice through the microprocessor 100 and sends data to transmitter XMIT "E" 121 where the data is discretely encoded, converted to a spread spectrum signal, and broadcast as the PMU voice communication signal (E) through antennas 7–10. The detailed workings of XMIT "E" 121 are disclosed in T1 of FIG. 18.

In addition, the microprocessor 100 sends data to transmitter XMIT "F" 122 where the data is discretely encoded, converted to a spread spectrum signal, and broadcast as anti-bark deterrent signal (F) through antennas 7–10. The detailed workings of XMIT "F" 122 are disclosed in T1 of FIG. 18.

A receiver RECR "A" 105 receives the correct PMU 2's discretely encoded spread spectrum escape signal (H), received by antenna 8, and the microprocessor 100 transmits data to the liquid crystal display (LCD) 110 and the LED display 109 indicating to the owner or guardian which PMU 2 or 3 has left the predetermined confinement area. Furthermore, the microprocessor 100 activates alarms 120 and communication and printer ports 108.

A receiver RECR "B" 104 receives the discretely encoded spread spectrum location signal (J) from PMU 2 or 3, received by antenna 10. If the animal 4 or human 5 wearing PMU 2 or 3 has escaped, the microprocessor 100 transmits data to the LCD 110 and the LED display 109 indicating to the owner or guardian that the escaped animal 4 or human 5 wearing PMU 2 or 3 has returned. Furthermore, the microprocessor 100 analyzes all other data received from the PMU 2 or 3 for any additional problems, such as a low battery, and activates alarms 120 and communication ports 108.

A receiver RECR "C" 103 receives the discretely encoded spread spectrum location signal (I) from PMU 2 or 3, received by antenna 7. If the animal 4 or human 5 wearing PMU 2 or 3 has escaped, the microprocessor 100 transmits data to the LCD 110 and the LED display 109 indicating to the owner or guardian that the animal 4 or human 5 wearing the PMU 2 or 3 is about to enter a predetermined danger area. Furthermore, the microprocessor 100 analyzes all other data received from the PMU 2 or 3 for any additional problems, such as a low battery, and activates alarms 120 and communication ports 108.

A receiver RECR "D" 101 receives the discretely encoded spread spectrum location signal (J) from PMU 2 or 3, received by antenna 9. If the animal 4 or human 5 wearing PMU 2 or 3 has escaped, the microprocessor 100 transmits data to the LCD 110 and the LED display 109 indicating to the owner or guardian that the escaped animal 4 or human 5 wearing PMU 2 or 3 has returned. Furthermore, the microprocessor 100 analyzes all other data received from the PMU 2 or 3 for any additional problems, such as a low battery, and activates alarms 120 and communication ports 108.

The detailed workings of the receivers 101 and 103–105 are disclosed in T1 of FIG. 18 and described below.

Figure 19:
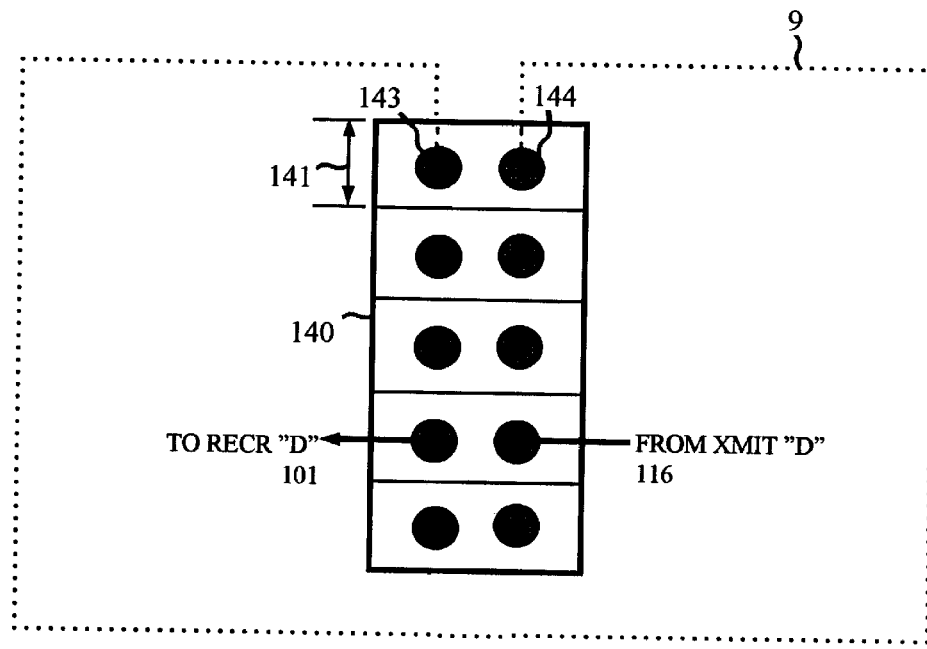
FIG. 19 is a schematic illustration of an exemplary antenna connection section in accordance with the present invention.

FIG. 19 shows the antenna 9 of FIG. 17 coupled to an antenna connection section 140. Antenna connection subsection 141 illustrates one antenna wire input connector 143 and an antenna wire output connector 144.

Section 140 illustrates the ability for multiple antennas 9 to be used for multiple safety zones on one system, thus enabling the owner or guardian to identify in which zones the PMU 2 or 3 is located. Antennas 7, 8, and 10 also have this type of multiple antenna connector.

Figure 20:
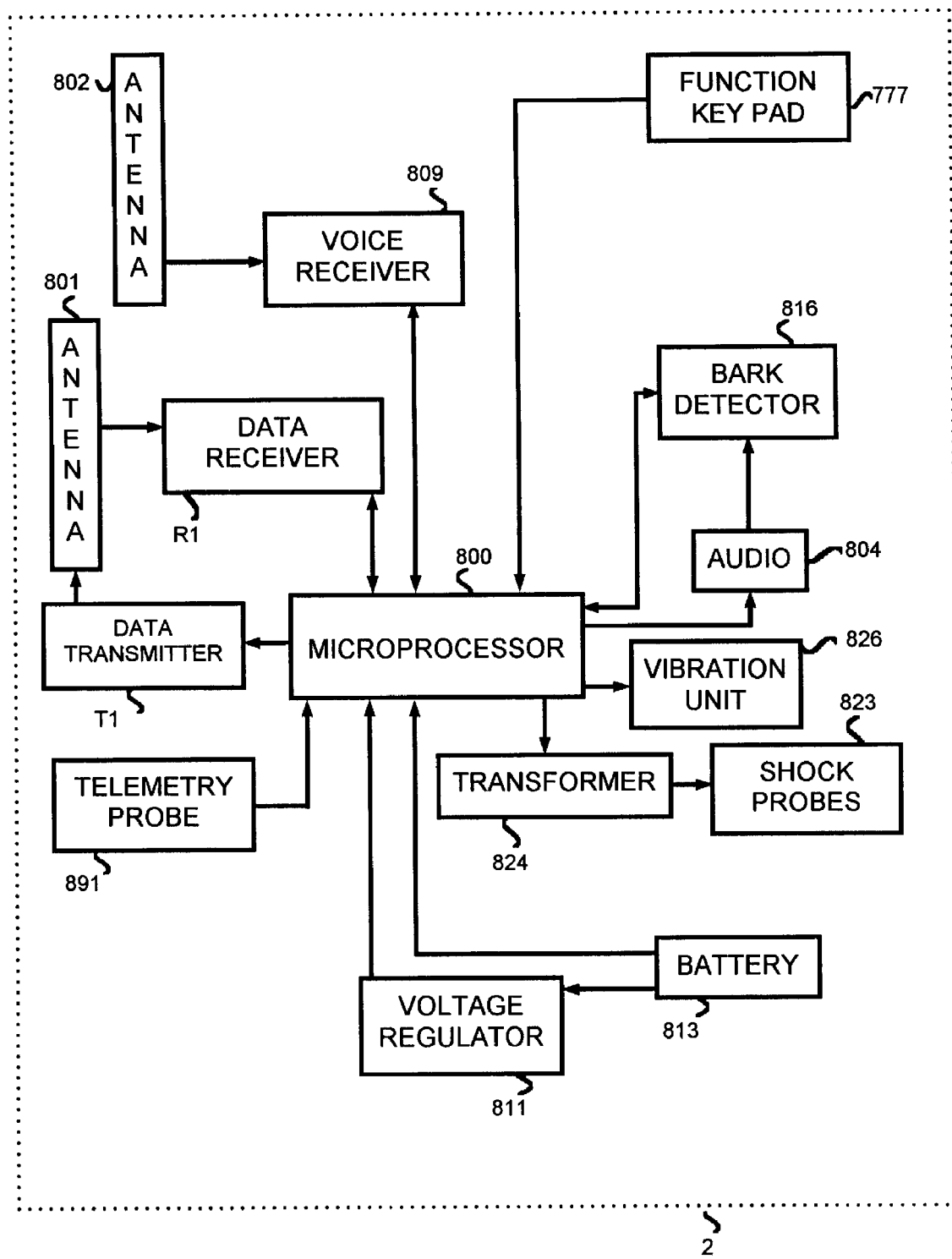
FIG. 20 is a block diagram of an exemplary Personal Monitoring Unit (PMU) in accordance with the present invention.

FIG. 20 is a schematic diagram of the PMU 2 or 3. A battery 813 powers the PMU 2 or 3. A voltage regulator 811 regulates a constant level of voltage, e.g., 8 volts, to the circuitry. A microprocessor 800 monitors the battery 813's energy level.

A function key pad 777 is used to program the serial number, PIN, audio settings, shock deterrent setting, and other information of the PMU 2 or 3 needed to manually activate or deactivate sections of the PMU 2 or 3. Function keypad 777 may be removable so that it may be removed after programming. Alternatively, as described above, the home base 1 may be used to program the PMU 2 or 3.

An antenna 801 is tuned to a predetermined frequency of, for example, 27 KHz. A data receiver R1 detects the discretely encoded spread spectrum signal (A) transmitted from antenna 8. Signal (A) is preferably between 5% and 90% of the predetermined transmission wattage of signal (A). Once the first strength level of signal (A) is detected, the signal is despread by data receiver R1 and the encoded sequence is verified by the microprocessor 800. Receiver R1 may be manufactured by RF Microdevices of Greenwood, N.C. under Part No. RF 2423. If the signal is incorrect, the circuitry powers down. If the signal is correct, the microprocessor 800 sends the predetermined voltage level to a transformer 824. The voltage is increased and then delivered to shock probes 823. Simultaneously, the microprocessor 800 sends predetermined tones to the audio unit 804 and energizes the vibration unit 826.

The audio unit 804 is used as a microphone for a bark detector 816. When enabled by the microprocessor 800, the bark detector 816 detects when the animal 4 barks, thus initializing the preprogrammed deterrents such as an electrical shock, audio, and/or vibration.

A telemetry probe 891 sends heartbeat, probe temperature, and skin moisture readings of the animal 4 to the microprocessor 800.

When prompted, a voice receiver 809 is energized. An antenna 802 is tuned, for example, to 57 MHz. The decoding sequence and audio demodulation techniques are well known. The voice receiver 809 transmits the extracted data to the microprocessor 800, which in turn activates the audio unit 804. This enables the animal 4 to hear the owner or guardian's verbal instructions.

When prompted, a data transmitter T1 transmits the requested data from the microprocessor 800 in a spread spectrum format through the antenna 801. The data transmitter is, for example, Part No. RF 2423 manufactured by RF Micro Devices of Greenwood, N.C.

Figure 21:
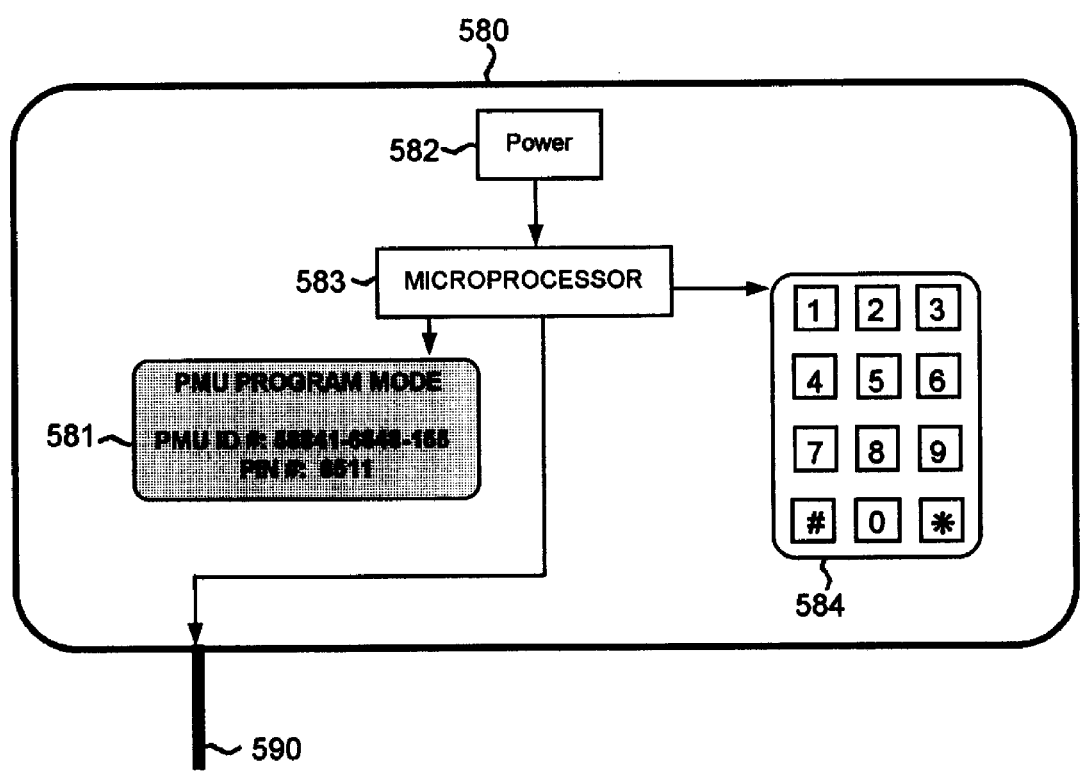
FIG. 21 is a schematic illustration of a PMU program unit in accordance with the present invention.

FIG. 21 illustrates a PMU program unit 580. The PMU program unit 580 is used to trouble shoot and program the serial number and PINs of the PMU 2 or 3. A display 581 is an LCD. A power supply 582 energizes the unit. A key pad 584 enables the owner, guardian, or technician to read and/or reprogram the serial number and PINs of the PMU 2 or 3. The microprocessor 583 downloads the information or request to the PMU 2 or 3 attached to a probe 590. The unit is not used for programming deterrent levels or reading data pertaining to deterrents administered to the animal 4 by the PMU.

Figure 22:
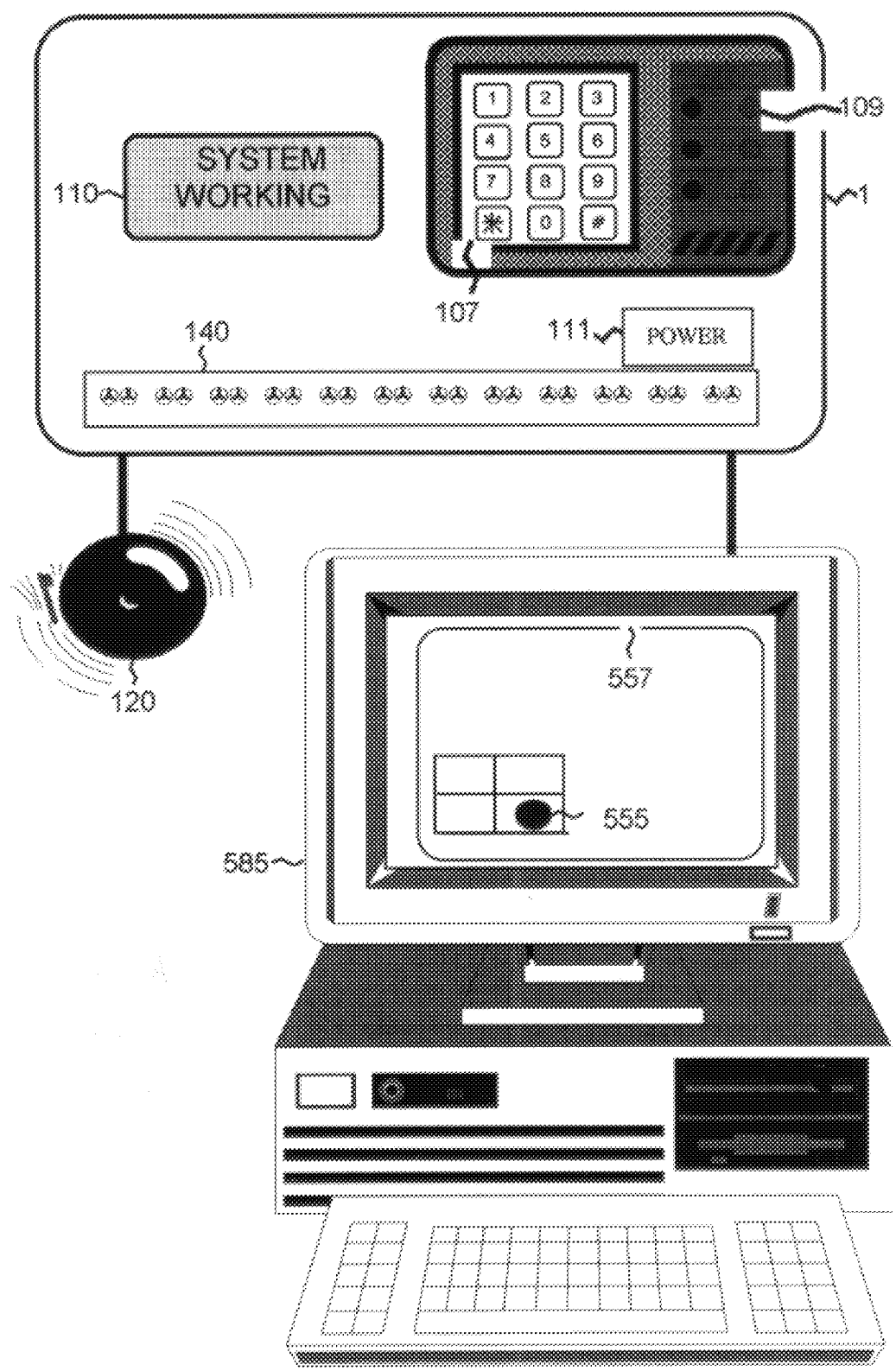
FIG. 22 is a schematic illustration of a computer monitoring a PMU in accordance with the present invention.

FIG. 22 shows home base 1 connected to a computer 585. This enables the owner or guardian to view the location 555 of PMU 2 or 3 on a computer monitor. On the screen in FIG. 22, four rooms of a building are shown, and the PMU 2 or 3 is located in one of the four rooms. The location of the PMU 2 or 3 may be determined by antennas disposed in the rooms that allow the location of the PMU 2 or 3 to be determined based on signals transmitted from the PMU 2 or 3 and received by the antennas. The on-screen ring 557 that is surrounding the rooms represents the surrounding wire. As described with respect to FIG. 17, a power supply 111 powers the home base 1, a key pad 107 is used to enter serial numbers and PINs, and information is displayed on an LED display 109 and on LCD 110. Also shown is the alarm 120 and the antenna connection section 140.

Figure 23:
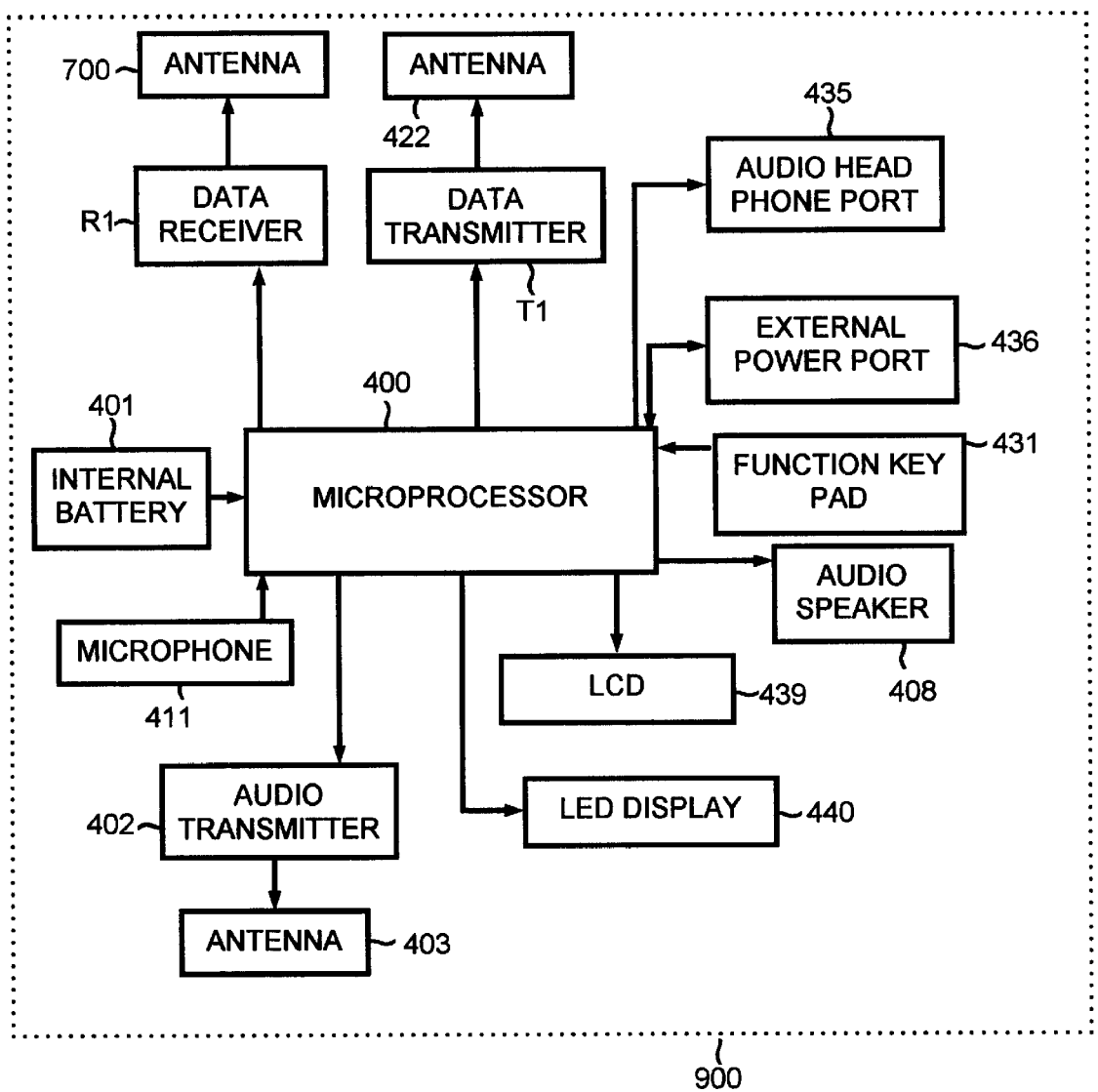
FIG. 23 is a block diagram of an exemplary portable tracking unit in accordance with the present invention.

FIG. 23 shows a portable tracking unit (PTU) 900 powered by an internal battery 401 and an external power port 436. The portable tracking unit 900 is programmed through the function key pad 431.

To send programmed instructions to the PMU 2 or 3, the microprocessor 400 sends data to data transmitter T1 which encrypts the signal, converts it to spread spectrum for transmission, and broadcasts it via antenna 422.

An antenna 700 is tuned to a predetermined frequency, for example, 900 MHz. A data receiver R1 detects the discretely encoded spread spectrum signal (J) transmitted from PMU 2 or 3 (e.g., step 3500 in FIG. 1). A signal (J) is preferably between 5% and 90% of the predetermined transmission wattage of signal (A). Once the first strength level of signal (J) is detected, the signal is despread by the data receiver R1 (step 3504) and the encoded sequence is verified by the microprocessor 400 (step 3507). If the signal is incorrect, the circuitry powers down (step 3508). If the signal is correct (step 3514), the microprocessor 400 activates data transmitter T1 of the PTU 900 to send a predetermined number of transmission bursts at predetermined time intervals, for example, one burst every 15 seconds for 5 minutes.

Upon receiving and verifying the correct signal (J), the microprocessor 400 displays the direction, approximate distance, telemetry data, and self diagnosis operation performance data of PMU 2 or 3 on the LCD 439. The intensity of the signal is also indicated on the LED display 440.

The owner or guardian is able to communicate with the PMU 2 or 3 via a microphone 411. The electronically digitized voice is sent to the microprocessor 400 and then is encrypted and changed to a spread spectrum form of transmission by an audio transmitter 402. This signal is then broadcast via an antenna 403 to the PMU 2 or 3.

An audio head phone port 435 enables the owner or guardian to listen to the audio signal indicator of the PTU 900 via a head phone set or ear phone rather than the audio speaker 408.

The PTU 900 can emit an audible noise that changes in volume, intensity, and/or pitch as the PTU 900 moves relative to the transmitted beacon signal of the receiver.

Figure 24:
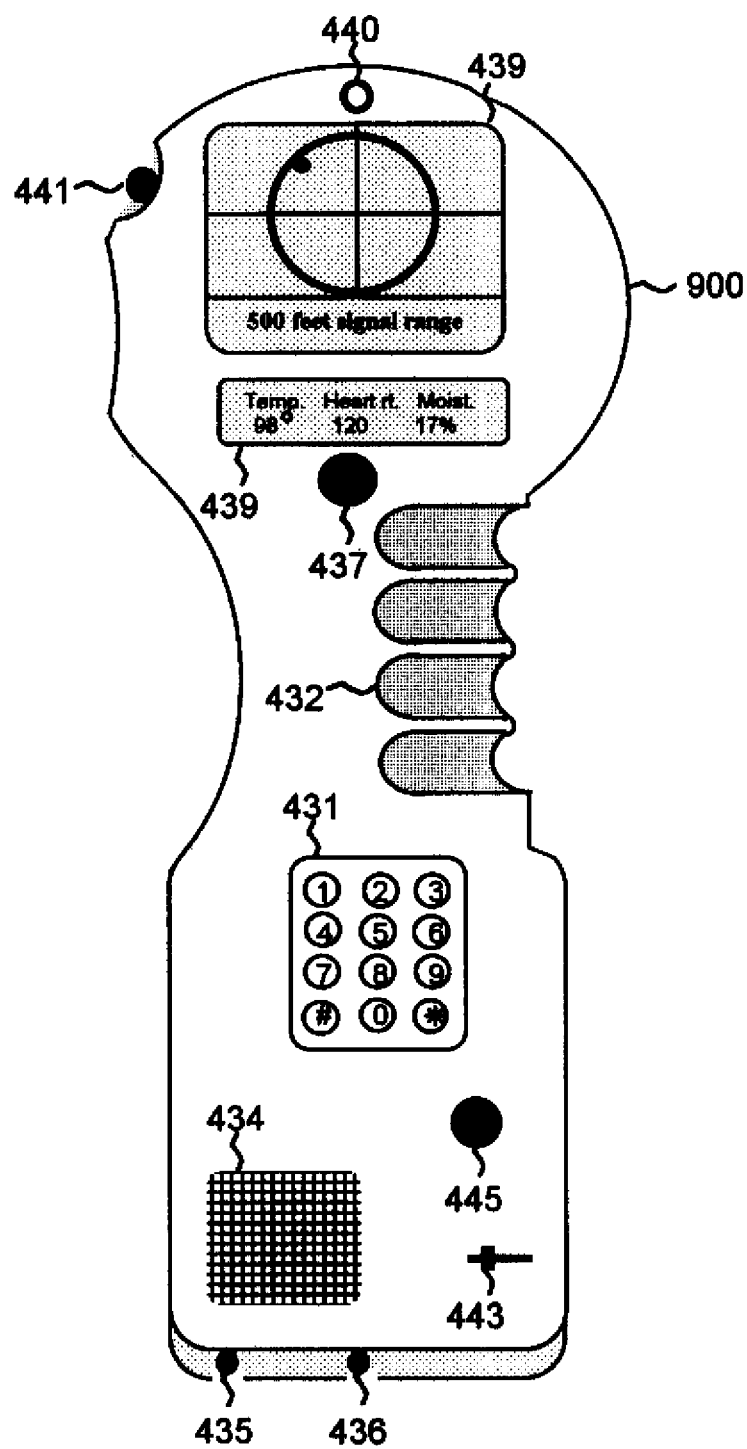
FIG. 24 is a schematic illustration of a portable tracking unit in accordance with the present invention.

FIG. 24 illustrates an exemplary portable tracking unit 900 in accordance with the present invention. FIG. 24 contains similar elements as have been described above with respect to FIG. 23. These elements are labeled identically and their description is omitted for brevity. A hand grip 432 affords the owner or guardian a more secure hold on the unit. A button 441 is depressed by the owner or guardian, thereby activating the audio transmission section of the unit. The owner or guardian speaks into a grid 434 where the microphone 411 and the audio speaker 408 are both located.

Referring to FIG. 20, when prompted in response to the transmission from the PTU 900, the voice receiver 809 of the PTU 2 or 3 is energized. The antenna 802 coupled to the voice receiver 809 is tuned, for example, to 57 MHz. This is the transmission frequency of the PTU 900. The decoding sequence and audio demodulation techniques for decoding the transmission are well known. The voice receiver 809 transmits the extracted data to the microprocessor 807, which in turn activates audio 804. This enables the animal 4 or human 5 to hear the owner or guardian's verbal instructions.

Buttons 437, 445, 443, and 441 are all internally connected to the function key pad 431. The button 437 can be depressed by the owner or guardian to transmit the program signal for the PMU 2 or 3 to activate its timed proximity transmission sequence.

Referring to FIGS. 25(a) and 25(b), the PMU 2 is shown with an exemplary number (four) of shock probes 823. Furthermore, an external antenna port 313 is shown which allows additional antennas to be placed in the harness or collar worn by the animal 2. Finally, a collar slot 311, which is part of the outer casing of the PMU 2, allows the collar 12 to be securely affixed to the PMU 2 by placing the collar through the strap.

FIG. 26 shows the PMU 2 with a well known type of interlocking collar 12 that uses conventional connectors 315 and 316 and is uniquely combined with the additional external antenna port 313. A wire 12a which acts as an antenna is placed in the collar 12 and is coupled to a connector 313a which may be coupled to external antenna port 313. A lead in the antenna can be exposed to touch the animal 4 or human 5 wearing the PMU 2 or 3 so that the body of the animal 4 or human 5 is used as a further antenna. When connectors 315 and 316 are engaged, external antenna port 313 is coupled to connector 313a so that the wire 12a incorporated into collar 12 serves as an antenna for PMU 2 or 3.

The PMU 2 or 3 can perform a self-system analysis to determine its operability. A program is placed inside the PMU 2 or 3 that performs this diagnosis.

Referring to FIGS. 27(a)–(c), the LCD 439 of PTU 900 is shown displaying a long range display screen 320, a medium range display screen 321, and a directional arrow screen 322. The PTU 900 is capable of autoranging in which a large area is initially scanned and displayed (FIG. 27(a)). As the received signal changes and increases in intensity indicating that the PMU 2 or 3 is closer to the PTU 900, a more narrow, higher resolution search area is displayed (FIGS. 27(b) and 27(c)).

Figure 18:
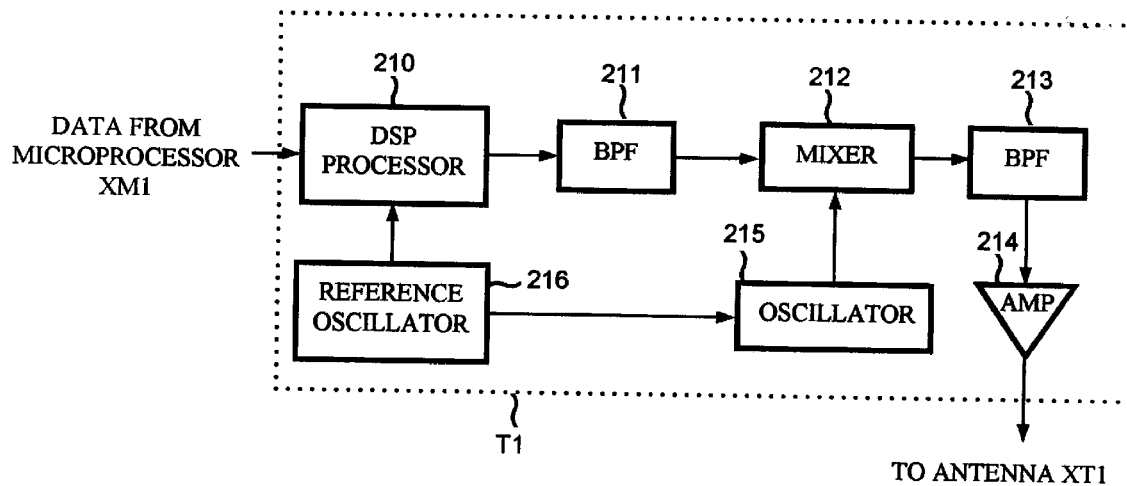
FIG. 18 is a block diagram of an exemplary transmitter in accordance with the present invention.

FIG. 18 shows a schematic diagram of an exemplary transmitter T1. A digital signal processing (DSP) processor 210 receives data from a microprocessor XM1. The microprocessor XM1 could be either the microprocessor 100, the microprocessor 400, or the microprocessor 800. The DSP processor 210 performs modulation functions such as amplitude shift keying (ASK), frequency shift keying (FSK), phase shift keying (PSK), binary phase shift keying (BPSK), quadrature phase shift keying (QPSK), quadrature amplitude modulation (QAM), or spread spectrum. A signal can be encoded with one of the non-spread spectrum modulation functions prior to being spread spectrum modulated. The multi-encoding techniques can be accomplished by the use of, for example, DSP processor ADSP 2181 manufactured by Analog Devices or Norwood, Mass. The output of the DSP processor 210 is filtered by the band pass filter (BPF) 211 which provides a signal to be up-converted to the transmission frequency via a mixer 212. A reference oscillator 216 supplies the clock signal to the DSP processor 210 as well as the reference signal to the oscillator 215 to provide a phase coherent system; i.e., the receiver is in sync with the transmitter. The up-converted signal from the mixer 212 is filtered by a band pass filter 213, then amplified by an amplifier 214 and transmitted from antenna XT1. The antenna XT1 can be antenna 7, antenna 8, antenna 9, antenna 10, antenna 422, or antenna 801.

Figure 28:
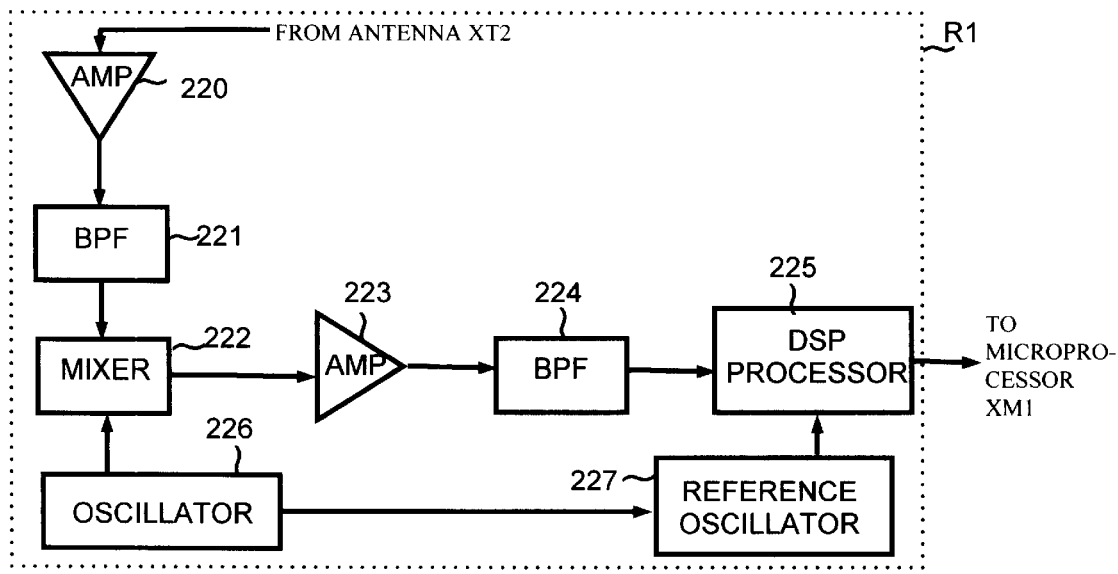
FIG. 28 is a block diagram of an exemplary receiver in accordance with the present invention.

FIG. 28 shows a schematic diagram of an exemplary receiver R1. An amplifier 220 receives the transmitted signal from a transmitter T1 via an antenna XT2. The antenna XT2 can be antenna 7, antenna 8, antenna 9, antenna 10, antenna 700, or antenna 801. The signal is amplified by the amplifier 220. The signal is then filtered by a band pass filter 221 and fed to a mixer 222. The mixer 222 receives its local oscillator from an oscillator 226 which is phase locked to a reference oscillator 227. The mixer 222 provides a signal to an amplifier 223 for amplification. The amplified signal is filtered by a band pass filter 224 and is provided as input to a DSP processor 225. The DSP processor 225 (e.g., ADSP2181, a DSP chip manufactured by Analog Devices, Norwood, Mass.) performs demodulation functions such as ASK, FSK, PSK, BPSK, QPSK, QAM, or spread spectrum. The DSP processor 225 then outputs the data to a microprocessor XM1.

Figure 29:
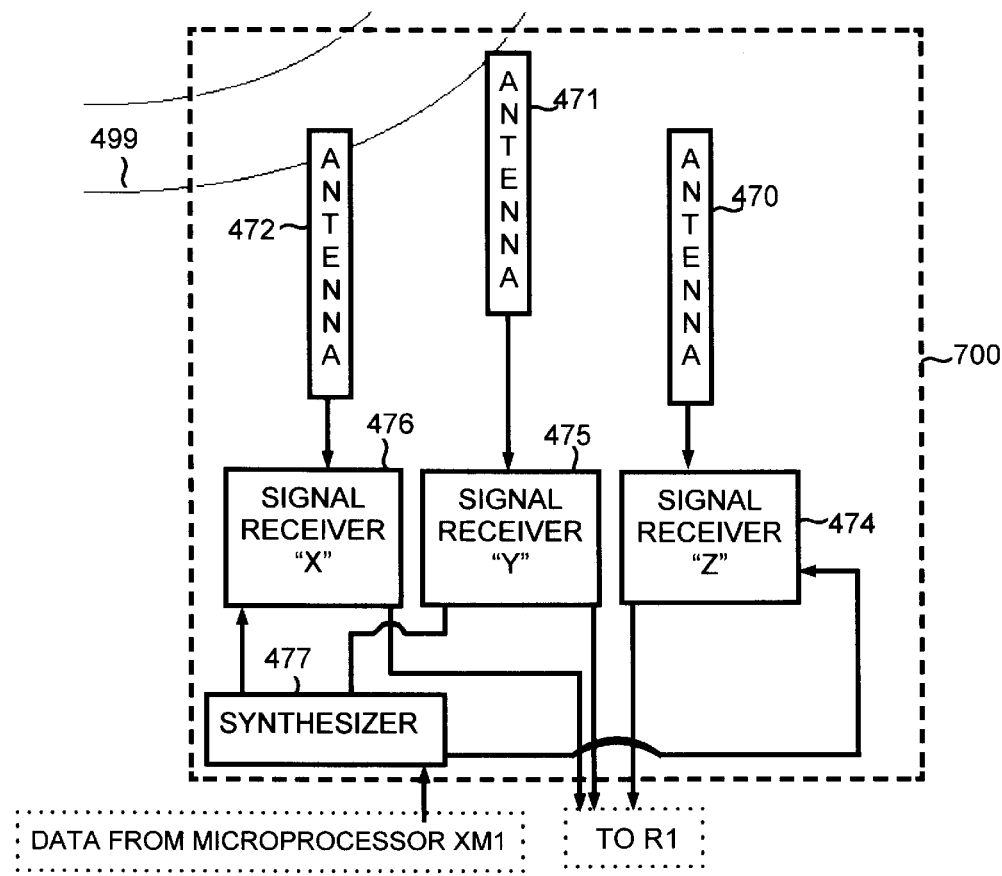
FIG. 29 is a block diagram of an exemplary directional receiving antenna in accordance with the present invention.

FIG. 29 shows the directional receiving antenna 700 of PTU 900. The antennas 470–472 form an omnidirectional antenna array and are tuned to receive the predetermined transmission signals 499 from the PMU 2 or 3 at a predetermined frequency, such as 900 MHz. The signal receivers 476, 475, and 474 receive transmission signals 499 via respective antennas 472, 471, and 470. A synthesizer 477 receives data from microprocessor XM1 and generates a stable local oscillator signal, for example 900 MHz, transmitted to signal receivers 474–476. As is well known, the exact timing of the signal's detection by each of the signal receivers 474–476 are compared to determine the direction of the PMU 2 or 3. Data is then fed into the receiver R1 of the personal tracking unit 900.

FIGS. 30–36 illustrate data 1200 vs. time 1400 for exemplary coding techniques using a receiver that is available from a standard manufacturer. The receiver R1 which is, for example, Part No. RF 2423 manufactured by RF Microdevices of Greenwood, N.C., samples the incoming signal wave at intervals 1450. The code 1350 "1010111" is shown in FIGS. 30–34.

Figure 30:
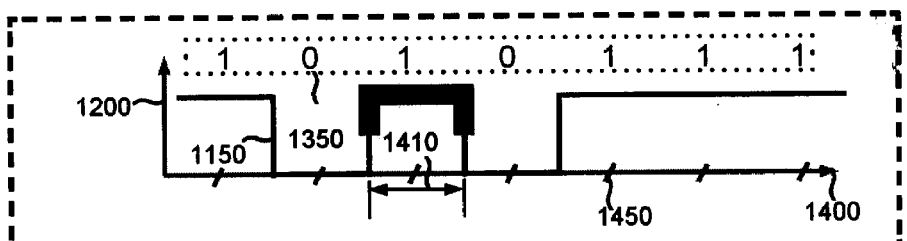
FIG. 30 is a graphical representation of data vs. time for an NRZ waveform in accordance with the present invention.

In FIG. 30, the coding technique uses a unipolar waveform or waveform excursions from zero are always in the same direction, either positive or negative. The unique characteristic of this signal 1150 is shown over interval 1450. FIG. 30 illustrates a nonreturn to zero (NRZ) waveform.

Figure 31:
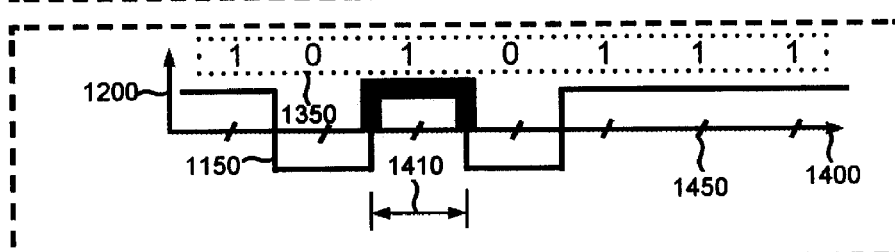
FIG. 31 is a graphical representation of data vs. time for a further NRZ waveform in accordance with the present invention.

In FIG. 31, the coding technique uses a polar waveform, which utilizes positive and negative polarities. For a long random sequence of 1's and 0's, the dc component averages out to zero. The unique characteristic of the signal 1150 is shown over interval 1410. FIG. 31 illustrates a nonreturn to zero (NRZ) waveform.

Figure 32:
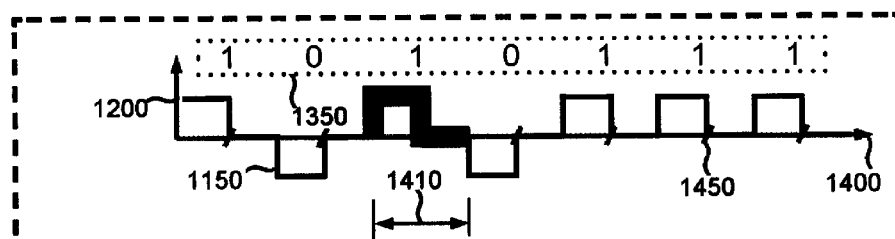
FIG. 32 is a graphical representation of data vs. time for a signal which returns to zero in accordance with the present invention.

In FIG. 32, the coding technique uses a polar return to zero (RZ) waveform. The signal 1150 returns to the zero baseline in the middle of the bit period, so transitions always occur even within a long string of like symbols, and bit timing can be extracted. The unique characteristic of this signal 1150 is shown over interval 1410.

Figure 33:
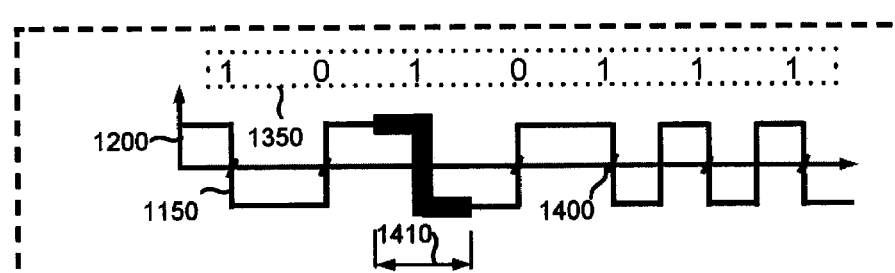
FIG. 33 is a graphical representation of data vs. time for a split-phase encoded signal in accordance with the present invention.

In FIG. 33, a split-phase or Manchester encoding technique is used. A transition between positive and negative levels occurs in the middle of each bit. This ensures that transitions will always be present so that bit timing can be extracted and, because each bit is divided equally between positive and negative levels, there is no dc component. The unique characteristic of this signal 1150 is shown over interval 1410.

Figure 34:
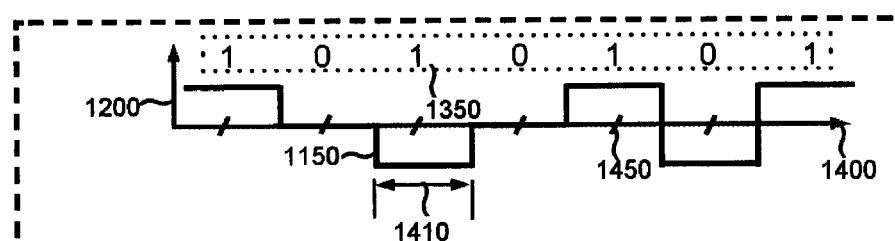
FIG. 34 is a graphical representation of data vs. time for an alternative mark inversion encoded signal in accordance with the present invention.

In FIG. 34, an alternative mark inversion (AMI) encoding technique is used. Here, the binary 0's are at the zero baseline level and the binary 1's alternate in polarity. In this way, the dc level is removed, while bit timing can be extracted easily. The unique characteristic of this signal 1150 is shown over interval 1410.

Figure 35:
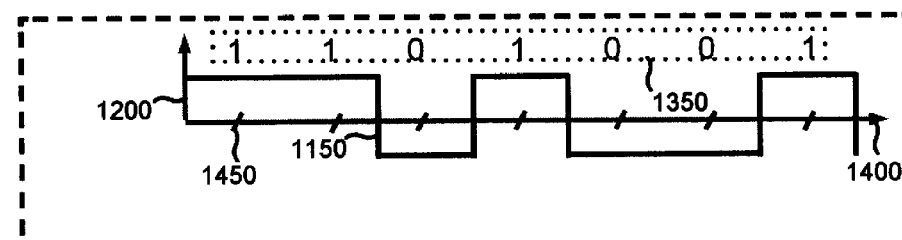
FIG. 35 is a graphical representation of data vs. time for a polar NRZ signal in accordance with the present invention.

In FIG. 35, bandwidth requirements are reduced by utilizing multilevel digital waveforms. A polar NRZ signal 1150 is shown for the code 1350 sequence "11010010".

FIG. 36 shows quarternary encoding techniques. By arranging the bits in groups of two, four levels can be used. The encoding is symmetrical about the zero axis, with the spacing between adjacent levels 1460 being 2A. Each level represents a symbol, the duration of which is the symbol period. For a quarternary waveform, the symbol period is equal to twice the bit period. In addition, the symbol rate is measured in units of baud, where one baud is one symbol per second. The unique characteristic of this signal 1150 is shown over interval 1410. The code 1350 "11010010" is shown in FIG. 36.

FIG. 37 illustrates the repeated transmission of the encoded word 1480 shown in FIG. 2. FIG. 38 illustrates the utilized techniques of selecting a predetermined sequence of multiple security codes 1490 used in the encoded word 1480.

Figure 39:
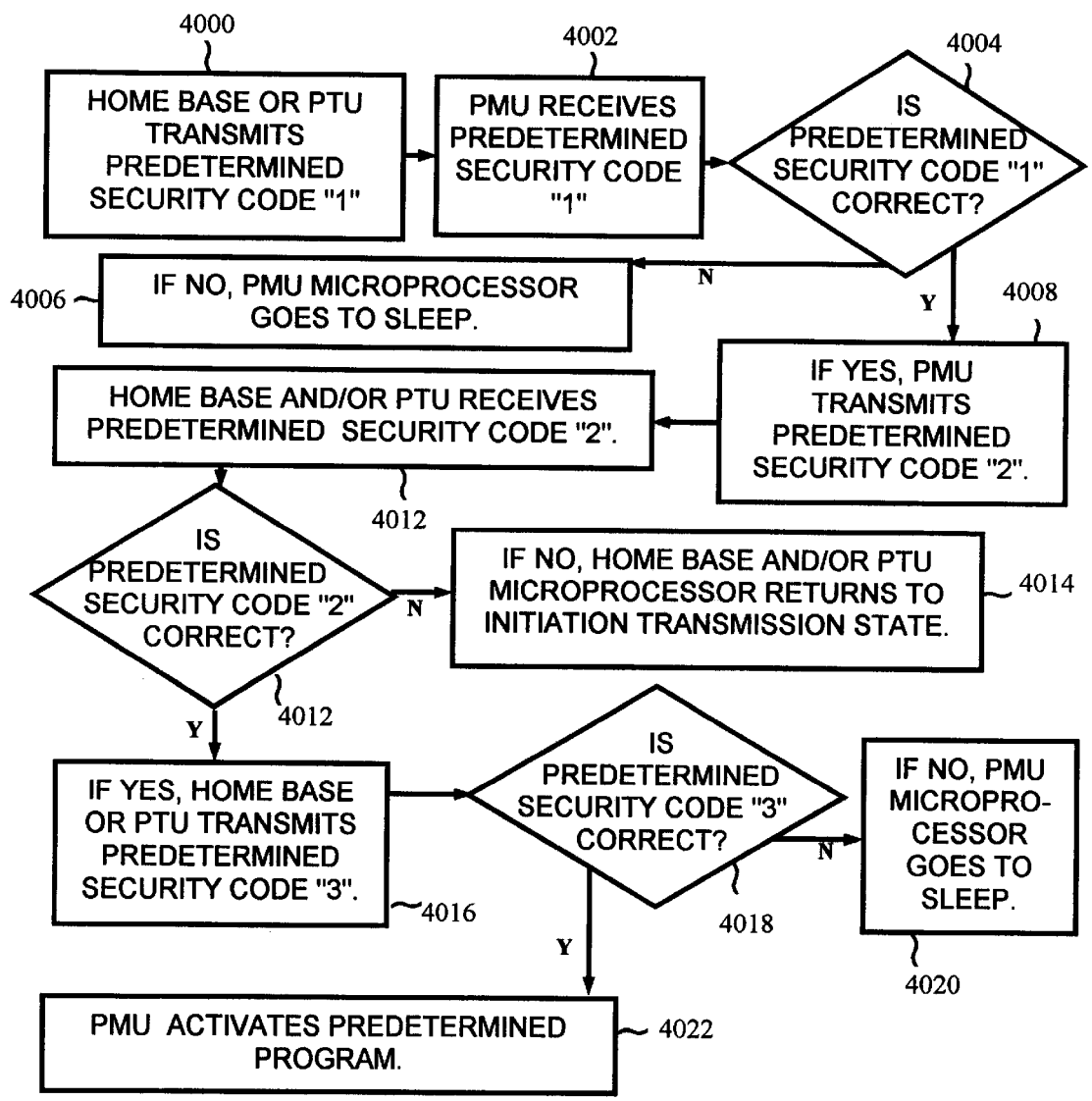
FIG. 39 is a flow diagram illustrating the operation of an exemplary confinement system responding to security codes in accordance with the present invention.

FIG. 39 shows a security screening process in accordance with an exemplary embodiment of the present invention. Initially, the home base 1 or personal tracking unit (PTU) 900 transmits a first predetermined security code (4000). The PMU 2 or 3 receives the first security code (4002) and determines if it is correct (verifies its authenticity) (4004). If the security code is not correct, then the PMU 900 microprocessor deenergizes (4006). If the security code is correct, then the PMU transmits a second predetermined security code back to the home base or PTU (4008). The home base or PTU receives the second security code (4010) and verifies its authenticity (4012). If the security code is not correct, then the microprocessor in the home base or PTU returns to its "initiate transmission" state (4014). If the security code is correct, then the home base or PTU transmits a third predetermined security code to the PMU (4016). The PMU receives the third security code and verifies its authenticity (4018). If the security code is not correct, then the PMU microprocessor deenergizes (4020). If the security code is correct, then the PMU activates a predetermined program to continue the program initiation.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A confinement arrangement for one of an animal and human comprising:

home base transmitting means for transmitting a spread spectrum modulated signal from a first signal-emitting wire; and receiver means for receiving the spread spectrum modulated signal, the receiving means having:
    (a) despread demodulation means for despread demodulating the received spread spectrum modulated signal to produce a despread demodulated signal,
    (b) comparator means for determining whether the received spread spectrum modulated signal was transmitted from the home base transmitting means, and
    (c) deterrent means, responsive to a signal strength of the received spread spectrum modulated signal, for producing a deterrent signal if the comparator means determined that the received spread spectrum modulated signal was transmitted from the home base transmitting means.

2. The confinement arrangement according to claim 1, wherein the spread spectrum modulated signal is one of a direct-sequence spread spectrum signal, a frequency-hopping spread spectrum signal, and a time-hopping spread spectrum signal.

3. The confinement arrangement according to claim 1, wherein:

the home base transmitting means includes means for discretely encoding the modulated spread spectrum signal with a digital signal;

the despread demodulation means extracts the digital signal;

the comparator means determines if the extracted digital signal was transmitted from the home base transmitting means; and the deterrent means produces the deterrent signal if the comparator means determined that the received digital signal was transmitted from the home base transmitting means.

4. The confinement arrangement according to claim 1, further comprising sound means for transmitting an audio signal to the receiver means, and wherein the receiver means has audio receiving means for converting the audio signal to an audio sound.

5. The confinement arrangement according to claim 4, wherein:

the sound means is disposed in the home base transmitting means, the sound means comprising:
    a) microphone means for converting the audio sound to the audio signal;
    b) amplifying means for increasing the signal level of the audio signal to produce an amplified signal;
    c) spread spectrum modulator means for modulating the amplified signal in response to an oscillator output signal to produce the spread spectrum modulated signal; and
    d) transmitter means for transmitting the spread spectrum modulated signal; and the audio receiving means comprises:
    a) an antenna for receiving the spread spectrum modulated signal;
    b) demodulator means for demodulating and despreading the spread spectrum modulated signal to produce a demodulated signal;

c) amplifying means for increasing the signal level of the demodulated signal to produce a second amplified signal; and d) audio speaker means for outputting the amplified signal.

6. The confinement arrangement according to claim 1, wherein the home base transmitting means is a portable tracking transceiver comprising:

transmitting means for transmitting at least one encoded spread spectrum signal;

tracking receiving means comprising at least one omni-directional antenna array for receiving at least one predetermined encoded spread spectrum signal from the receiver means; and direction indicating means for indicating the direction and proximity of the receiver means.

7. The confinement arrangement according to claim 6, wherein the home base transmitting means further comprises a memory means for storing the at least one predetermined encoded spread spectrum signal.

8. The confinement arrangement according to claim 6, wherein the portable tracking transceiver is programmed with at least one of a unique receiver number, at least one security personal identification number (PIN), at least one serial number of the receiver means, and a predetermined spread spectrum transmission sequence of at least one receiver means.

9. The confinement arrangement according to claim 6, wherein the receiver means transmits a transmitting location beacon signal and the portable tracking transceiver emits one of an encoded spread spectrum signal and a spread spectrum modulated signal activating the transmitting location beacon signal of the receiver means.

10. The confinement arrangement according to claim 9, wherein the transmitting location beacon signal is emitted for a predetermined time period to conserve battery life.

11. The confinement arrangement according to claim 6, wherein the portable tracking transceiver displays at least one of the directional location and the proximity of the receiver means to the portable tracking transceiver in response to a predetermined signal strength and a signal direction of a signal transmitted from the receiver means.

12. The confinement arrangement according to claim 11, wherein the display of at least one of the directional location and the proximity of the receiver means is on one of a liquid crystal display array and a light emitting diode array.

13. The confinement arrangement according to claim 11, wherein the portable tracking transceiver emits an audible noise that changes in at least one of volume, intensity, and pitch as the portable tracking transceiver moves relative to the at least one predetermined encoded spread spectrum signal from the receiver means.

14. The confinement arrangement according to claim 6, wherein the portable tracking transceiver further comprises at least one of an audible speaker, an ear phone jack input, and a head phone jack input.

15. The confinement arrangement according to claim 1, further comprising a main control post monitoring the home base transmitting means, wherein the main control post is linked to the home base transmitting means via one of a phone line, a wire, a radio transmission, and a low orbiting earth satellite.

16. The confinement arrangement according to claim 15, wherein the main control post detects and stores movement information data of the receiver means via one of an encoded spread spectrum transmission by the receiver means and an encoded spread spectrum modulated RF signal transmission by the receiver means.

17. The confinement arrangement according to claim 1, wherein the receiver means has an identification number and the home base transmitting means includes a multi-antenna array and means for determining when the receiver means is moved from a first predefined area to a second predefined area using the multi-antenna array and the ID number.

18. The confinement arrangement according to claim 1, wherein the home base transmitting means is programmed with a private personal identification number (PIN) that is transmitted along with a unique identification number on a predetermined frequency to allow the receiver means to identify the home base transmitting means.

19. The confinement arrangement according to claim 1, wherein the receiver means transmits a unique identification number on a predetermined frequency to allow the home base transmitting means to identify the receiver means.

20. The confinement arrangement according to claim 19, wherein the home base transmitting means comprises learning means for adding an additional receiver means having a unique identification number to the confinement arrangement, the learning means comprising:

means for retrieving the unique identification number of the additional receiver means; and means for transmitting an additional private personal identification number to the additional receiver means to allow the additional receiver means to identify the home base transmitting means.

21. The confinement arrangement according to claim 20, wherein the additional private personal identification number includes a base address of the home base transmitting means.

22. The confinement arrangement according to claim 1, wherein the receiver means is programmed by a user with a private personal identification number (PIN) that is transmitted along with a unique identification number on a predetermined frequency allowing the home base transmitting means to identify the receiver means.

23. The confinement arrangement according to claim 1, wherein the receiver means utilizes one of the animal and the human as an antenna source.

24. The confinement arrangement according to claim 1, wherein the receiver means performs a self-system analysis to determine if the receiver means is operational.

25. The confinement arrangement according to claim 1, wherein the receiver means includes at least one antenna disclosed in at least one of a belt, a collar, and a harness used to attach the receiver means to one of the animal and the human.

26. An animal confinement arrangement comprising:

a) a first signal-emitting wire disposed around and defining confinement area;

b) a second signal-emitting wire disposed within the confinement area defined by said first signal-emitting wire;

c) said home base transmitting means for transmitting a first spread spectrum modulated signal from the first signal emitting wire and a second spread spectrum modulated signal different from the first spread spectrum modulated signal from the second signal emitting wire, the home base transmitting means having an alarm which is activated by an alarm activation signal; and d) a receiver responsive to the first spread spectrum modulated signal and the second spread spectrum modulated signal, the receiver including:

(i) deterrent means responsive to a first strength level of the first spread spectrum modulated signal emitted from the first signal-emitting wire producing as an output a deterrent signal, (ii) disconnect and alarm means responsive to a second strength level of the first spread spectrum modulated signal emitted from the first signal-emitting wire, the second strength level being higher than the first strength level, the disconnect and alarm means producing as an output a signal to disconnect said deterrent means and to produce and broadcast to the first signal-emitting wire the alarm activation signal, (iii) reconnect means responsive to the second spread spectrum modulated signal producing as an output a signal to reconnect the disconnected deterrent means, and (iv) an antenna receiving and transmitting a plurality of signals.

27. The confinement arrangement according to claim 26, wherein the receiver further includes:

demodulator means for demodulating the received first spread spectrum signal to produce a demodulated signal; and comparator means for comparing the demodulated signal to a reference signal to produce a comparator signal indicating whether the received spread spectrum modulated signal was transmitted by the home base transmitting means;

wherein the deterrent means produces the deterrent signal if the comparator signal indicates that the received spread spectrum modulated signal is transmitted by the home base transmitting means.

28. The confinement arrangement according to claim 26, wherein the deterrent means produces an electrical shock as an output deterrent signal.

29. The confinement arrangement according to claim 26, wherein the deterrent means produces an audio signal at a predetermined frequency which is unpleasant to one of the animal and human as an output deterrent signal.

30. The confinement arrangement of claim 26, further comprising sound means for transmitting an audio signal to the receiver, and wherein the receiver further comprises:

audio receiving means for converting the audio signal to an audio sound; and timing means for energizing the audio receiver means for a predetermined period of time.

31. The confinement arrangement of claim 30, wherein:

the sound means is disposed in the home base transmitting means and comprises:
 a) microphone means for converting the audio sound to the audio signal,
 b) modulator means for modulating the audio signal in response to an oscillator output signal to produce a third modulated signal, and
 c) transmitter means for transmitting the third modulated signal; and the audio receiving means comprises:
 a) an antenna for receiving the third modulated signal emitted by the transmitter means,
 b) filtering means responsive to the received signal for receiving signals between a specified frequency range to produce a filtered signal,
 c) demodulator means for demodulating the filtered signal to produce a demodulated signal,
 d) amplifying means for increasing the signal level of the filtered signal to produce an amplified signal,
 e) detecting means, responsive to a strength level of the amplified signal, for generating a detector signal,
 f) relay means, responsive to the detector signal, for producing a relay control signal, and
 g) audio speaker means for outputting the amplified signal.

* * * * *

UNITED STATES PATENT AND TRADE MARK OFFICE
CERTIFICATE OF CORRECTION

PATENT NO. : 5,769,032
DATED : June 23, 1998
INVENTOR(S) : Yarnall, Sr. et al..

It is certified that error appears in the above-identified patent and that said Letters Patent is hereby corrected as shown below:

On the cover page, item [56], delete the last U.S. Patent Document, 5,656,850 8/1997 Yarnall, Jr. et al................119/721 X.

In Column 17, line 36, start a new paragraph after "FIG.2."

Signed and Sealed this

Fourth Day of May, 1999

*Attest:*

Q. TODD DICKINSON

*Attesting Officer*     Acting Commissioner of Patents and Trademarks